United States Patent
Matsumura et al.

(10) Patent No.: US 11,223,466 B2
(45) Date of Patent: Jan. 11, 2022

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 357 days.

(21) Appl. No.: 16/303,834

(22) PCT Filed: May 25, 2017

(86) PCT No.: PCT/JP2017/019487
§ 371 (c)(1),
(2) Date: Nov. 21, 2018

(87) PCT Pub. No.: WO2017/204285
PCT Pub. Date: Nov. 30, 2017

(65) Prior Publication Data
US 2020/0322119 A1    Oct. 8, 2020

(30) Foreign Application Priority Data
May 27, 2016    (JP) .............................. JP2016-106837

(51) Int. Cl.
*H04L 5/02*    (2006.01)
*H04L 5/00*    (2006.01)

(52) U.S. Cl.
CPC ............ *H04L 5/023* (2013.01); *H04L 5/0007* (2013.01); *H04L 5/0037* (2013.01); *H04L 5/0048* (2013.01); *H04L 5/0082* (2013.01)

(58) Field of Classification Search
None
See application file for complete search history.

(56) References Cited

U.S. PATENT DOCUMENTS

2012/0093120 A1    4/2012  Ko et al.
2016/0344526 A1*  11/2016  Fan ........................ H04L 5/0051
(Continued)

FOREIGN PATENT DOCUMENTS

| CN | 102804630 A | 11/2012 |
| CN | 103166880 A | 6/2013 |
| JP | 2015-015742 A | 1/2015 |

OTHER PUBLICATIONS

Nokia Networks, 3GPP TSG RAN1 NB-IOT adhoc, NB-PUSCH design for NB-IOT, R1-160008, Jan. 2016, all pages. (Year: 2016).*
(Continued)

*Primary Examiner* — Gregory B Sefcheck
*Assistant Examiner* — Srinivasa R Reddivalam
(74) *Attorney, Agent, or Firm* — Osha Bergman Watanabe & Burton LLP

(57) ABSTRACT

The present invention is designed so that, in a future radio communication system that accommodates multiple user terminals having different numerologies, these multiple user terminals can transmit UL reference signals properly. According to the present invention, a user terminal receives information related to an uplink (UL) reference signal, and controls transmission of the UL reference signal in a specific period based on the information related to the UL reference signal. In this specific period, UL reference signals of a plurality of user terminals where different numerologies are configured are multiplexed.

4 Claims, 32 Drawing Sheets

(56) References Cited

U.S. PATENT DOCUMENTS

| | | | |
|---|---|---|---|
| 2017/0070994 A1* | 3/2017 | Rico Alvarino | H04L 5/0007 |
| 2017/0164350 A1* | 6/2017 | Sun | H04L 5/0007 |
| 2017/0208581 A1* | 7/2017 | Yang | H04L 1/1854 |
| 2017/0331577 A1* | 11/2017 | Parkvall | H04J 11/0079 |
| 2019/0123864 A1* | 4/2019 | Zhang | H04B 7/024 |

OTHER PUBLICATIONS

International Search Report issued in corresonding International Application No. PCT/JP2017/019487, dated Aug. 15, 2017 (5 pages).
Written Opinion of the International Searching Authority issued in corresponding International Application No. PCT/JP2017/019487, dated Aug. 15, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action in counterpart Chinese Patent Application No. 201780032844.6 dated Jan. 13, 2021 (8 pages).
Office Action issued In counterpart Japanese Application No. 2018-519600, dated Jul. 13, 2021 (6 pages).

* cited by examiner

FIG. 6A

| BIT | SRS SUBCARRIER SPACING [kHz] |
|---|---|
| 00 | 15 |
| 01 | 30 |
| 10 | 60 |
| 11 | 120 |

FIG. 6B

| BIT | SRS CP DURATION [us] |
|---|---|
| 00 | 0.1 |
| 01 | 0.5 |
| 10 | 1.0 |
| 11 | 5.0 |

FIG. 7B

| BIT | SRS CYCLIC SHIFT SEQUENCE |
|---|---|
| 000 | Cs0 |
| 001 | Cs1 |
| 010 | Cs2 |
| 011 | Cs3 |
| 100 | Cs4 |
| 101 | Cs5 |
| 110 | Cs6 |
| 111 | Cs7 |

FIG. 7A

| BIT | SRS BANDWIDTH |
|---|---|
| 00 | bw0 |
| 01 | bw1 |
| 10 | bw2 |
| 11 | bw3 |

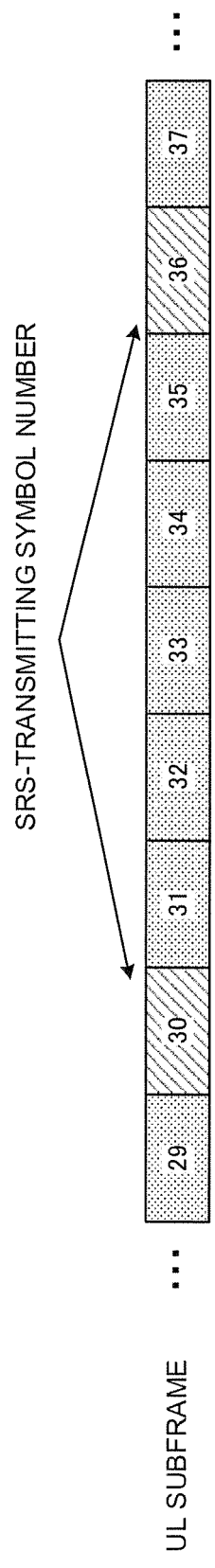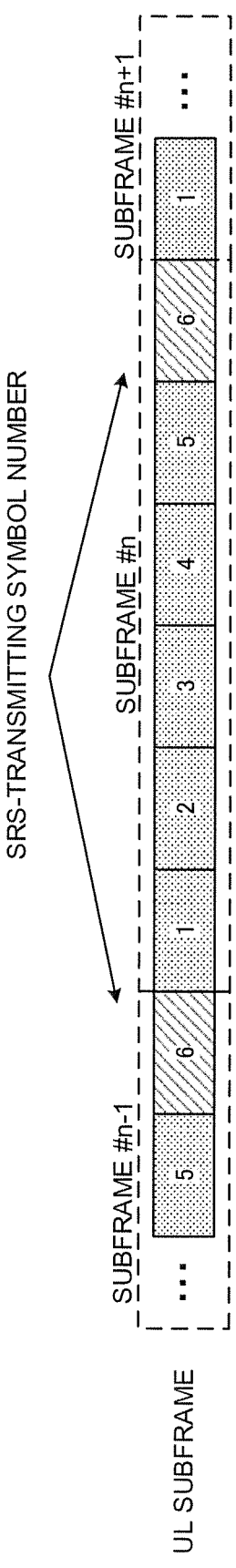
FIG. 8A
FIG. 8B

FIG. 23A
FIG. 23B
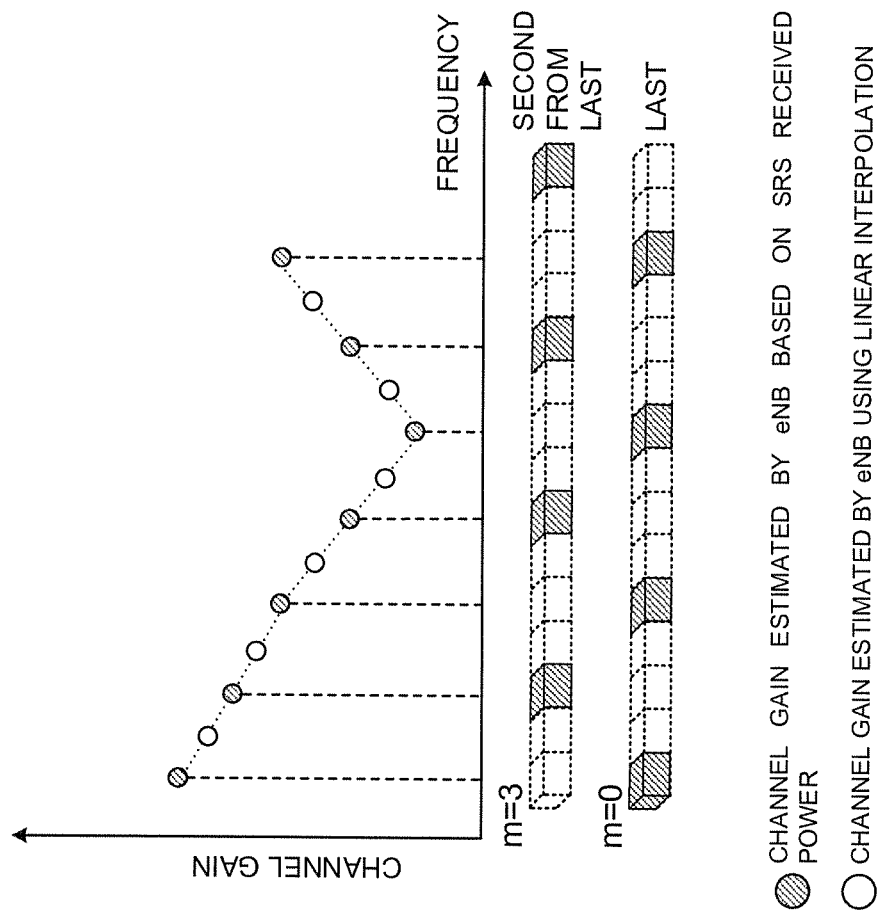
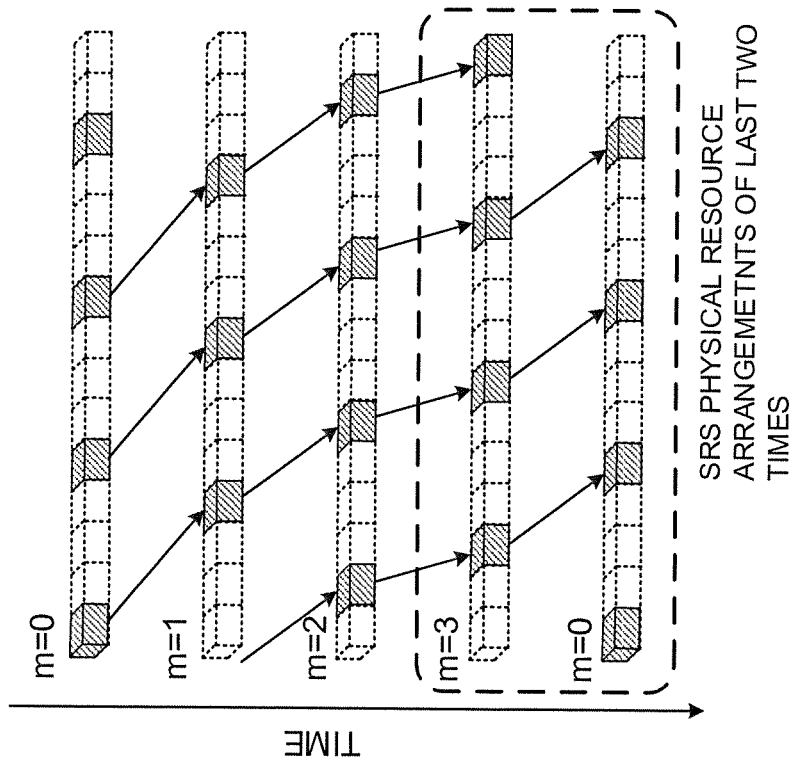

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate multiple carriers (component carriers (CCs), cells, etc.) is introduced in order to achieve broadbandization. Each carrier is configured with the system bandwidth of LTE Rel. 8 as one unit. In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which multiple cell groups (CGs) formed by different radio base stations are configured in a user terminal, is also introduced. Each cell group is comprised of at least one cell (CC, cell, etc.). In DC, since multiple CCs of different radio base stations are integrated, DC is also referred to as "inter-eNB CA."

In existing LTE systems (for example, LTE Rels. 8 to 13), downlink (DL) and/or uplink (UL) communication are carried out using 1-ms transmission time intervals (TTIs). This 1-ms TTI is the unit of time to transmit one channel-encoded data packet, and is the processing unit in scheduling, link adaptation and so on. A TTI of 1 ms is also referred to as a "subframe," a "subframe duration" and/or the like.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, etc.), it is desirable to accommodate various services such as high-speed and large-capacity communication (eMBB (enhanced Mobile Broad Band)), massive access (mMTC (Massive MTC)) from devices (user terminal) for inter-device communication (M2M (Machine-to-Machine)) such as IoT (Internet of Things) and MTC (Machine Type Communication), and low-latency, reliable communication (URLLC: Ultra-Reliable and Low Latency Communication), in a single framework. In URLLC, better latency reduction effect than eMBB or mMTC is required.

Thus, in future radio communication systems, it is assumed that a plurality of services having different requirements for latency reduction will be co-present. Therefore, future radio communication systems are expected to accommodate multiple user terminals having different numerologies (also referred to as "multiple numerologies," "multi-numerology," etc.). Here, "numerologies" refers to communication parameters in the frequency direction and/or the time direction (for example, at least one of the subcarrier spacing (subcarrier spacing), the bandwidth, the symbol duration, the time duration of a CP (CP duration), the time duration of a TTI (TTI duration), the number of symbols per TTI, the radio frame configuration, the filtering process, the windowing process, and so on).

Thus, in future radio communication systems where multiple user terminals having different numerologies are accommodated, how to transmit UL reference signals (for example, SRS (Sounding Reference Signal) and/or DMRS (DeModulation Reference Signal)) of a plurality of user terminals is the problem.

The present invention has been made in view of the above, and it is therefore an object of the present invention to provide, a user terminal and a radio communication method, whereby UL reference signals can be transmitted properly in future radio communication systems that accommodate multiple user terminals having different numerologies.

Solution to Problem

According to one aspect of the present invention, a user terminal has a receiving section that receives information related to an uplink (UL) reference signal, and a control section that controls transmission of the UL reference signal in a specific period based on the information related to the UL reference signal, and, in this user terminal, in the specific period, UL reference signals of a plurality of user terminals where different numerologies are configured are multiplexed.

Advantageous Effects of Invention

According to the present invention, when a radio communication system accommodates multiple user terminals having different numerologies, these multiple user terminals can transmit UL reference signals properly.

BRIEF DESCRIPTION OF DRAWINGS

FIG. 6A is a diagram to show an example of numerology information representing SRS subcarrier spacing, and FIG.

Figures 9A, 9B:
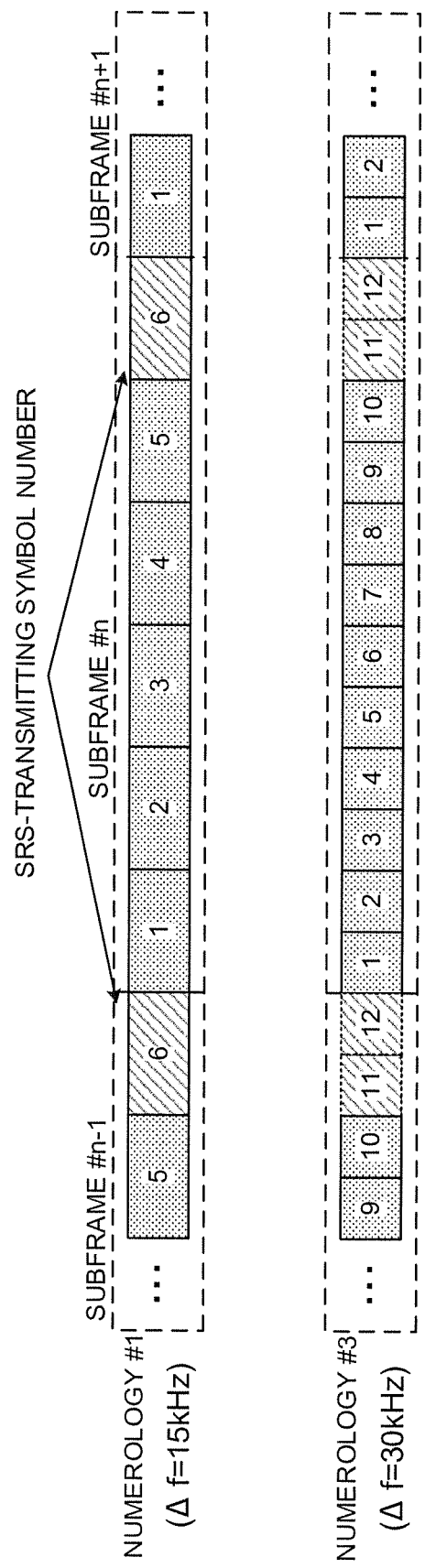
Figure 10:
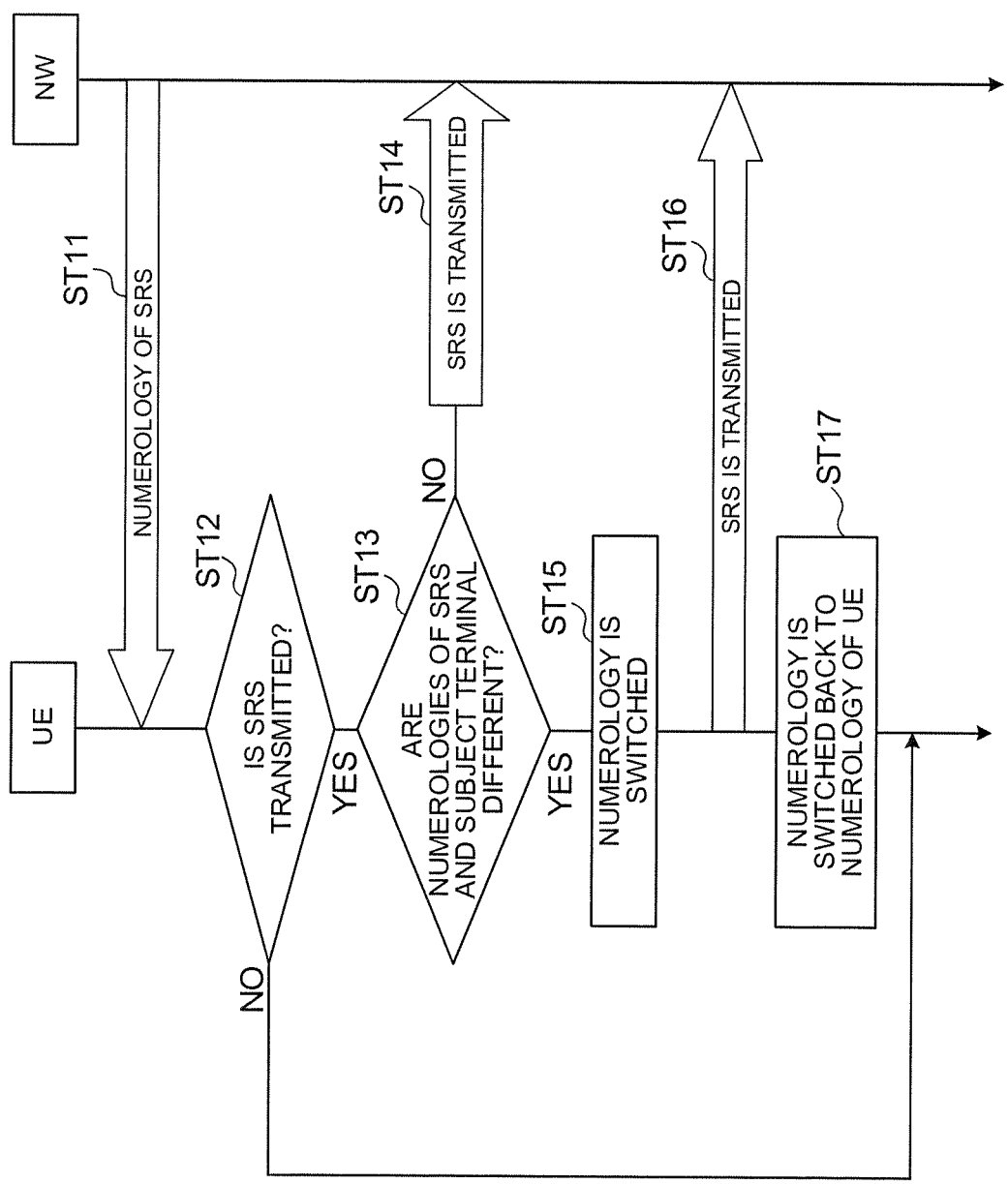
Figure 11:
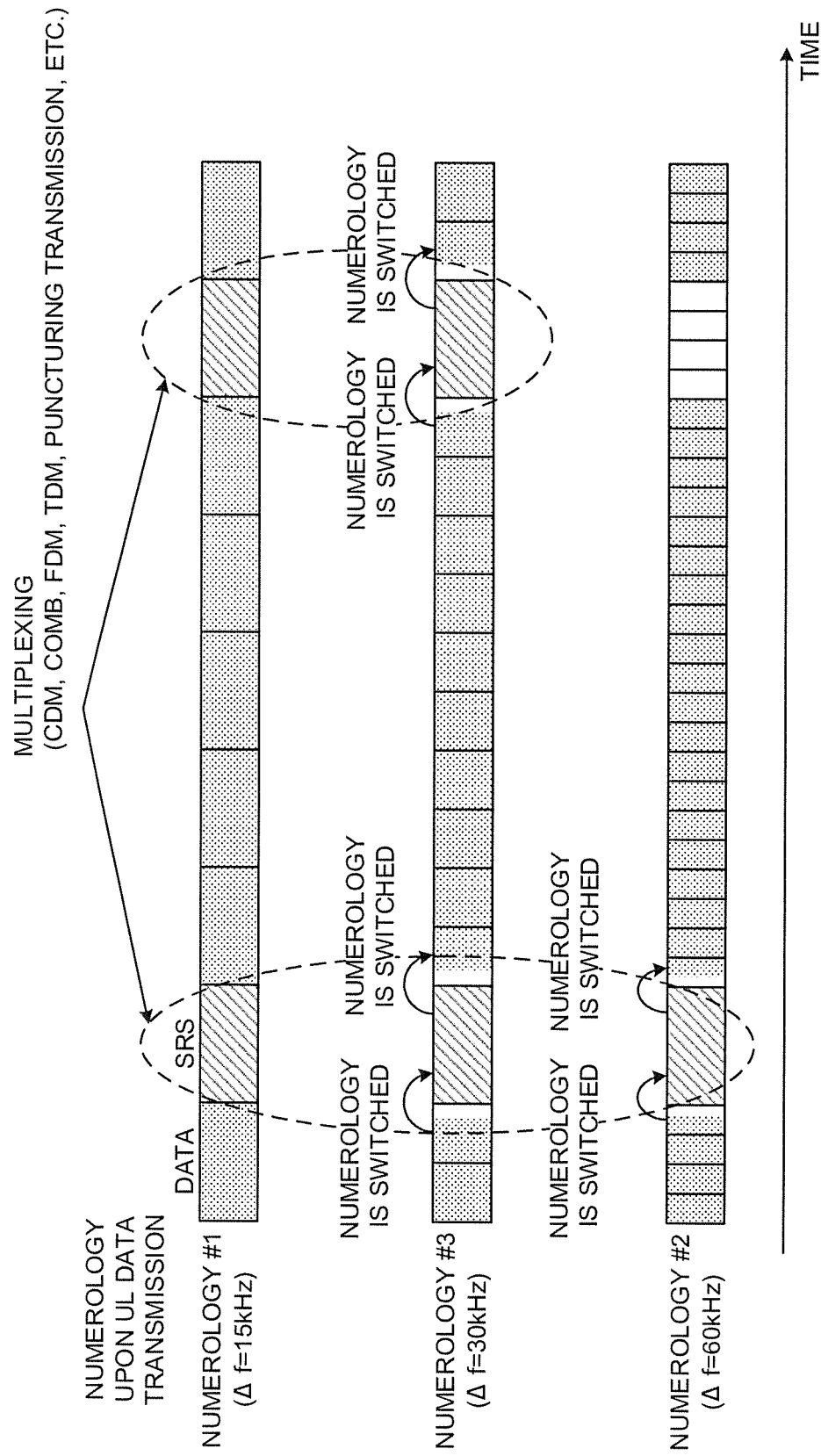
Figure 12:
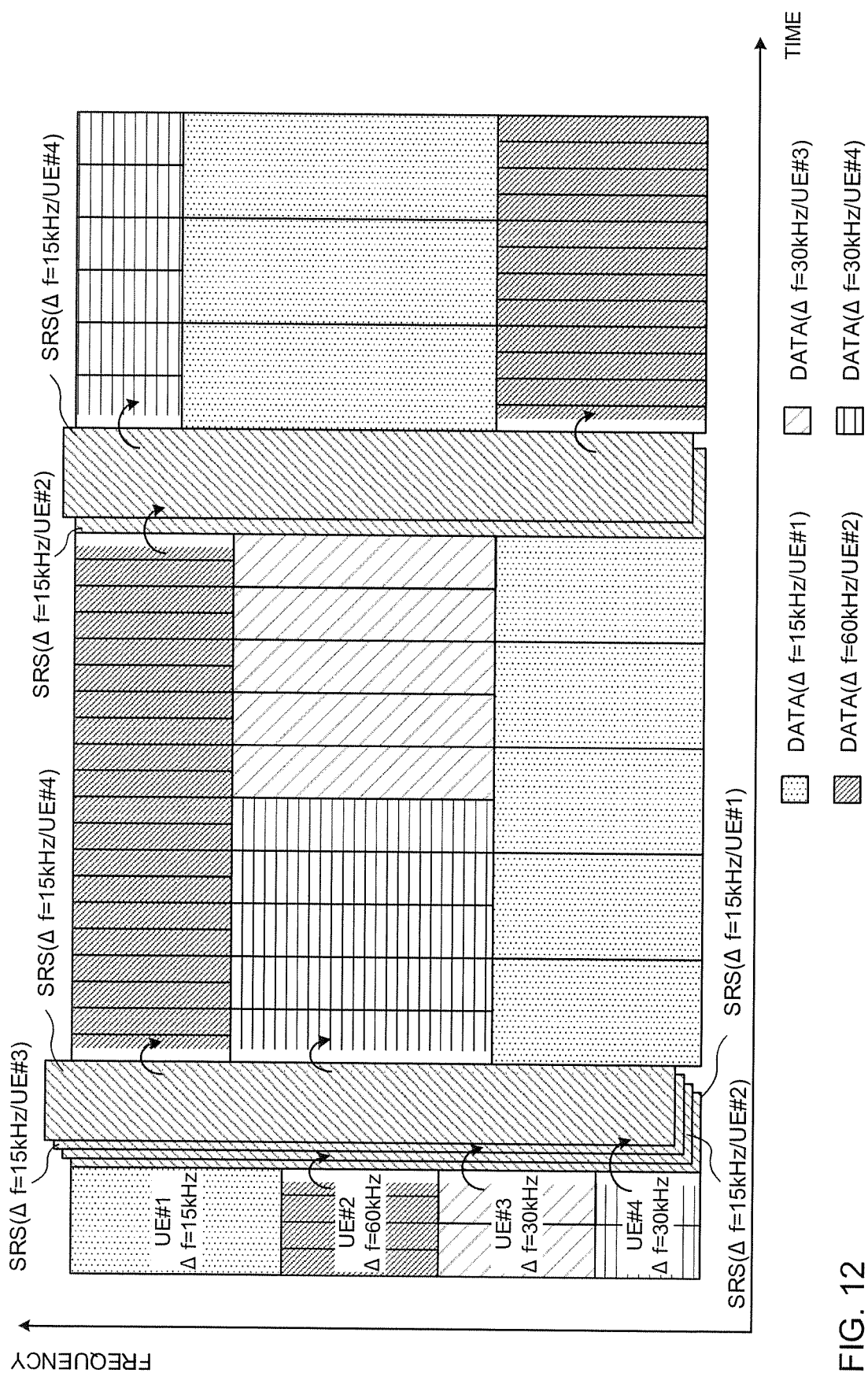
Figure 13:
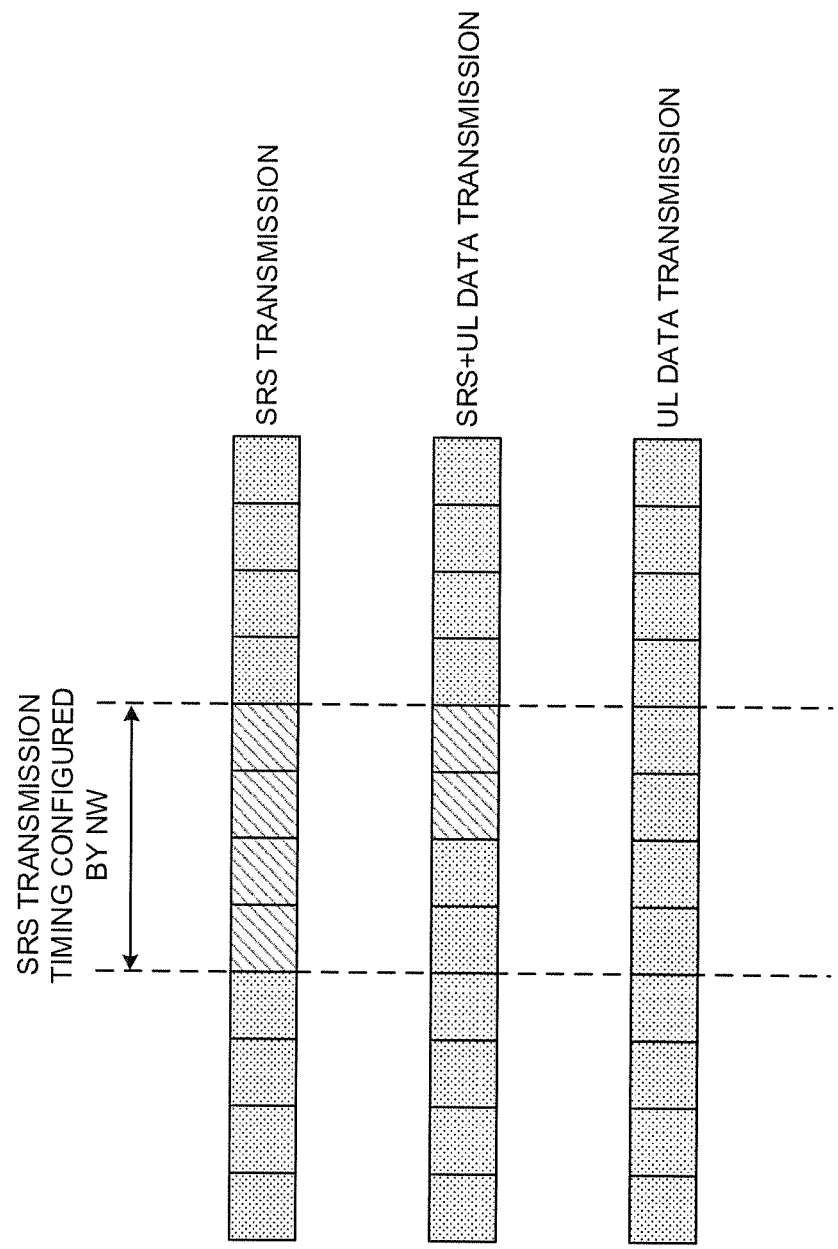
Figure 14:
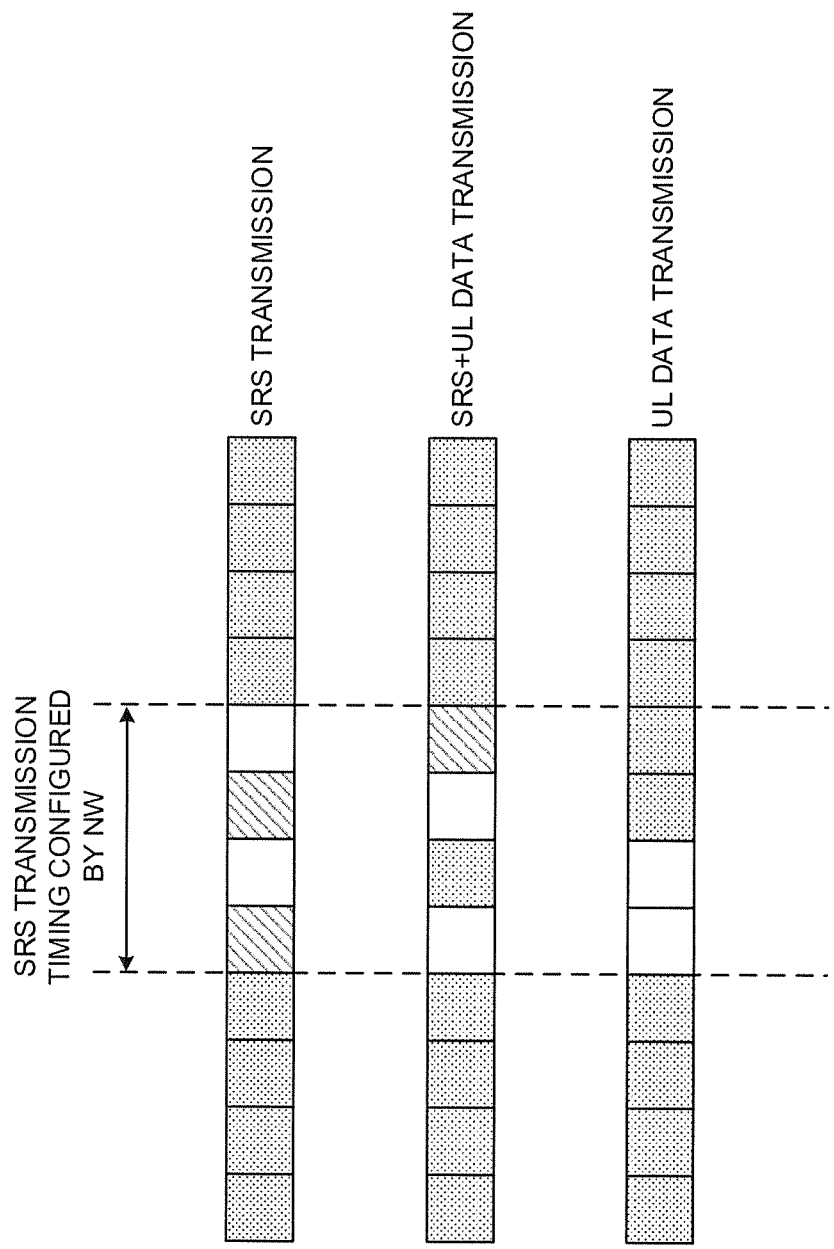
Figure 15:
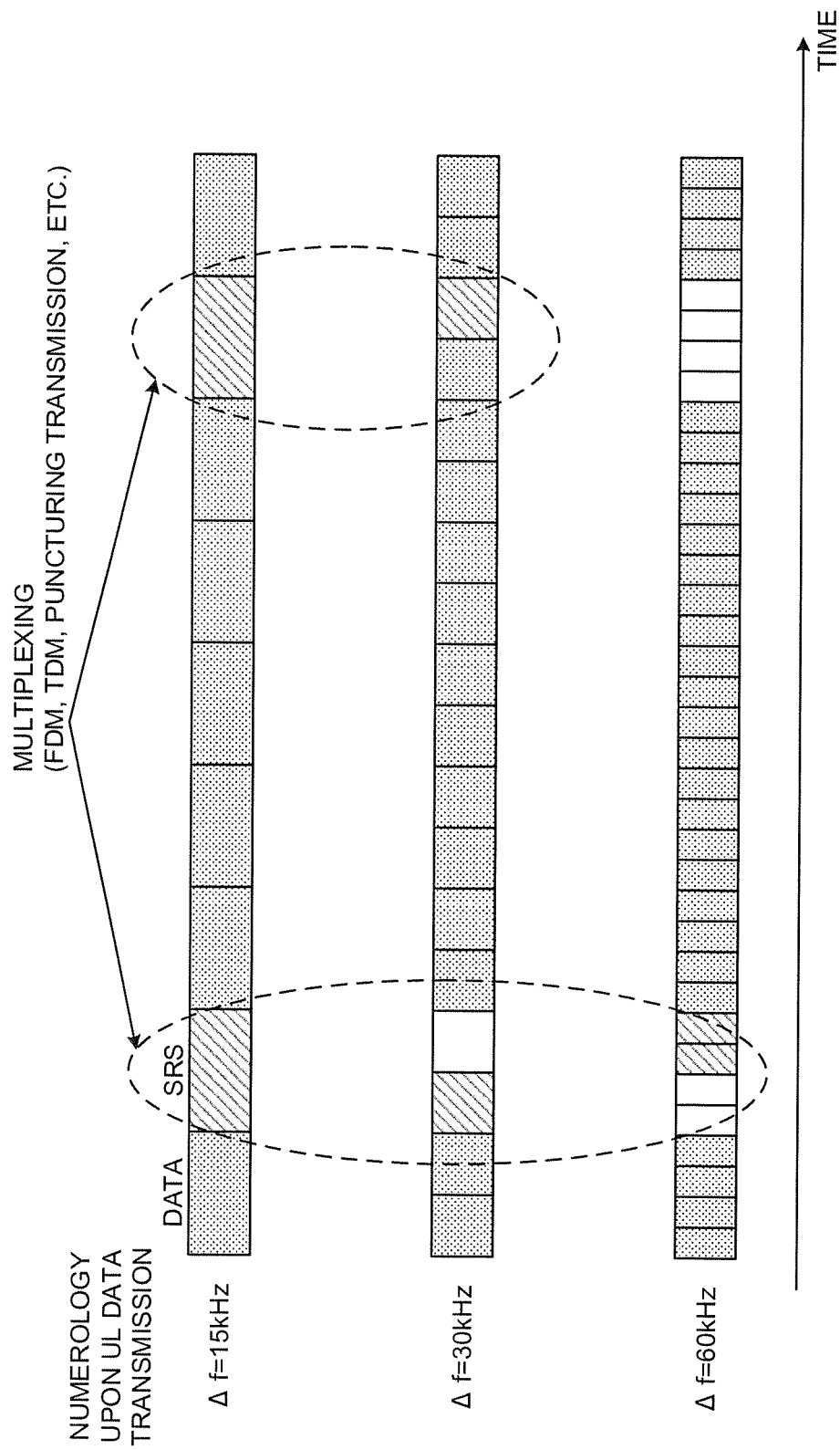
Figure 16:
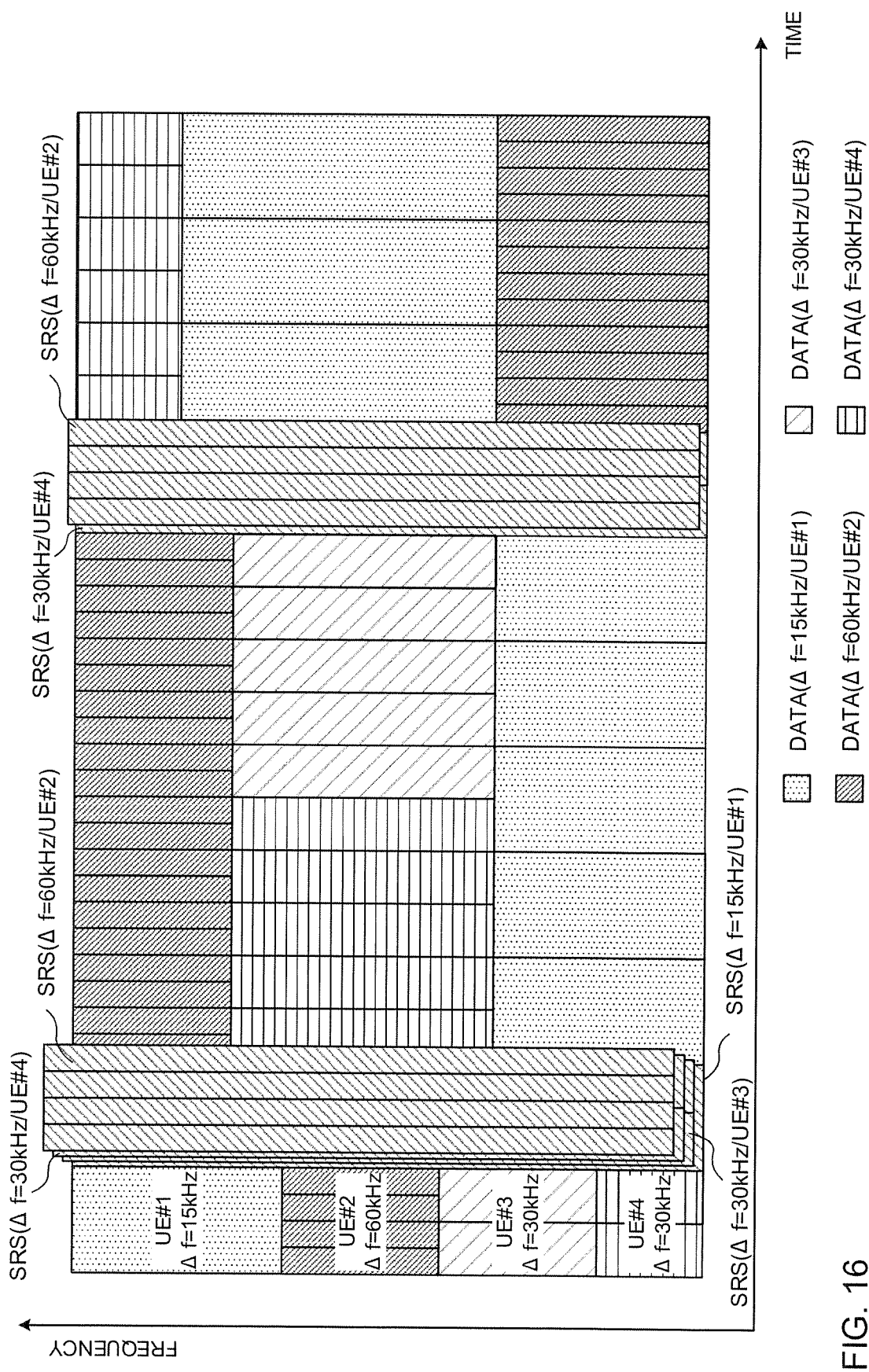
Figure 17:
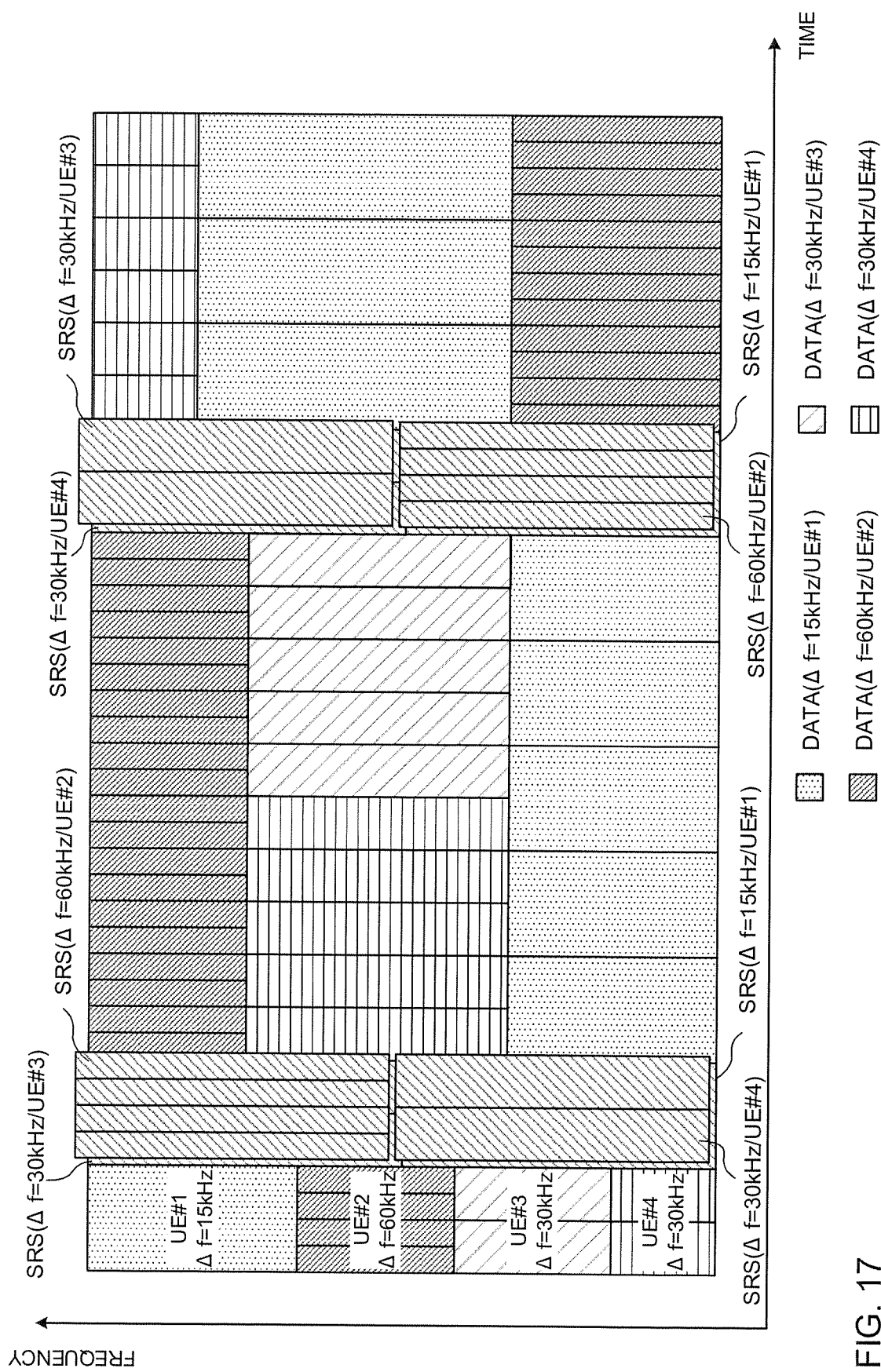
Figure 18:
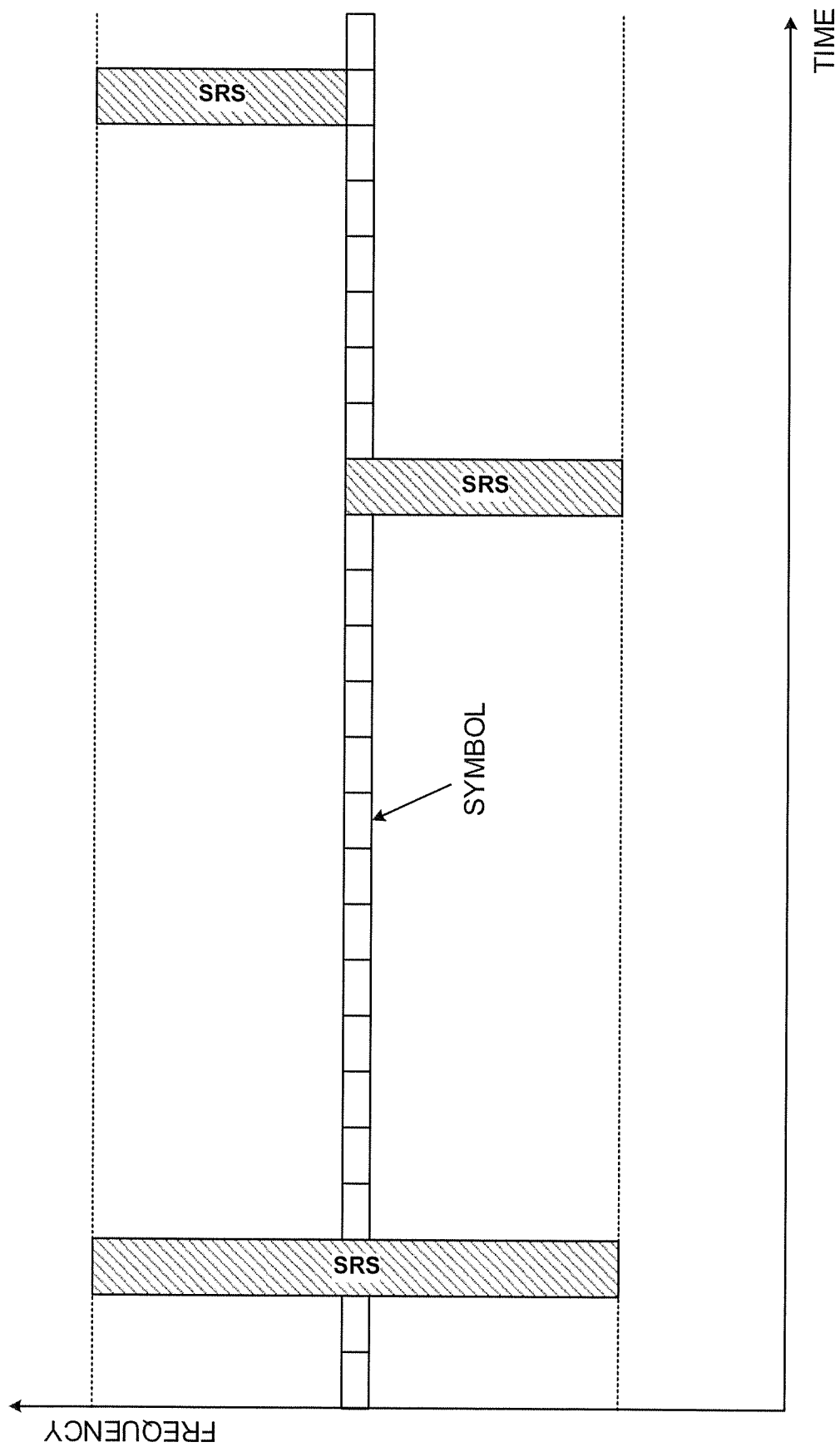
Figure 19:
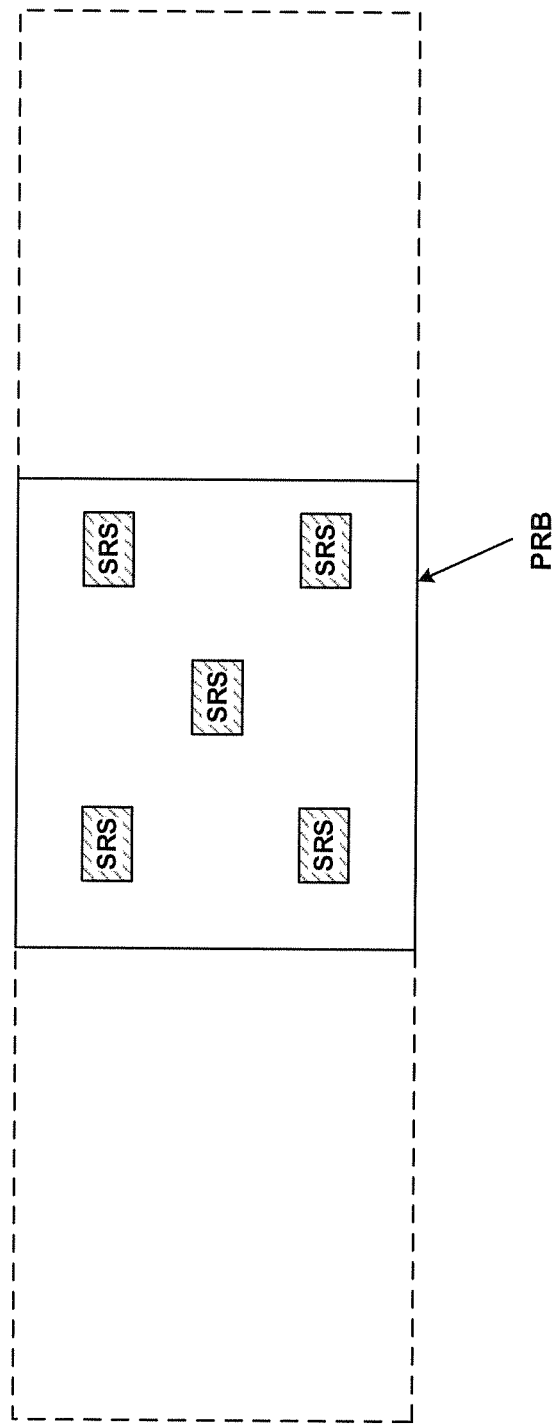
Figure 20:
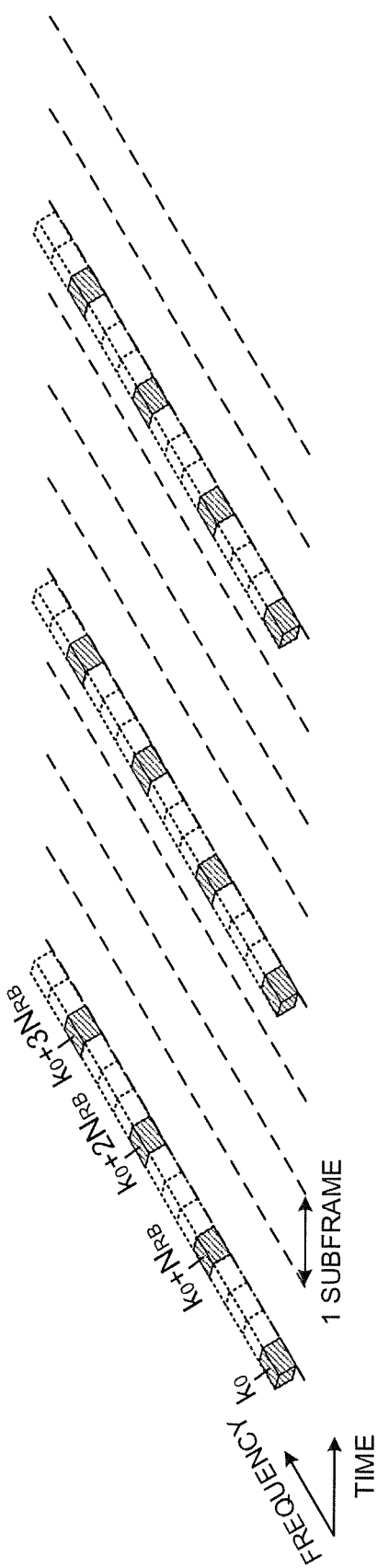
Figure 21:
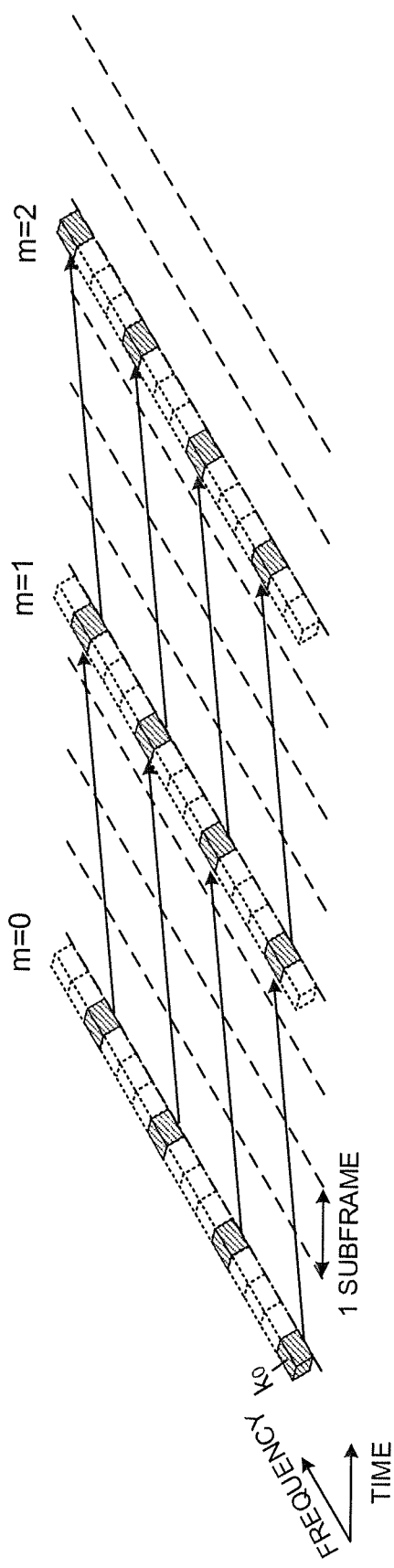
Figure 22:
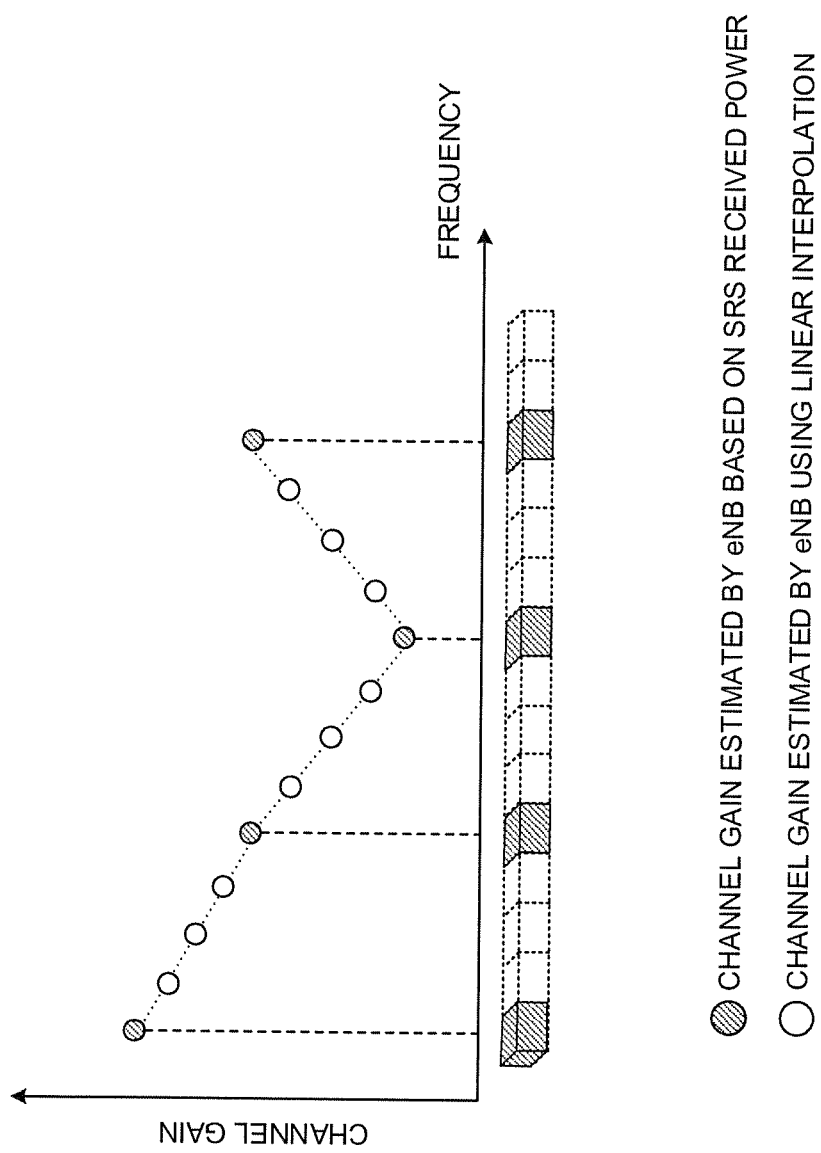
Figure 24:
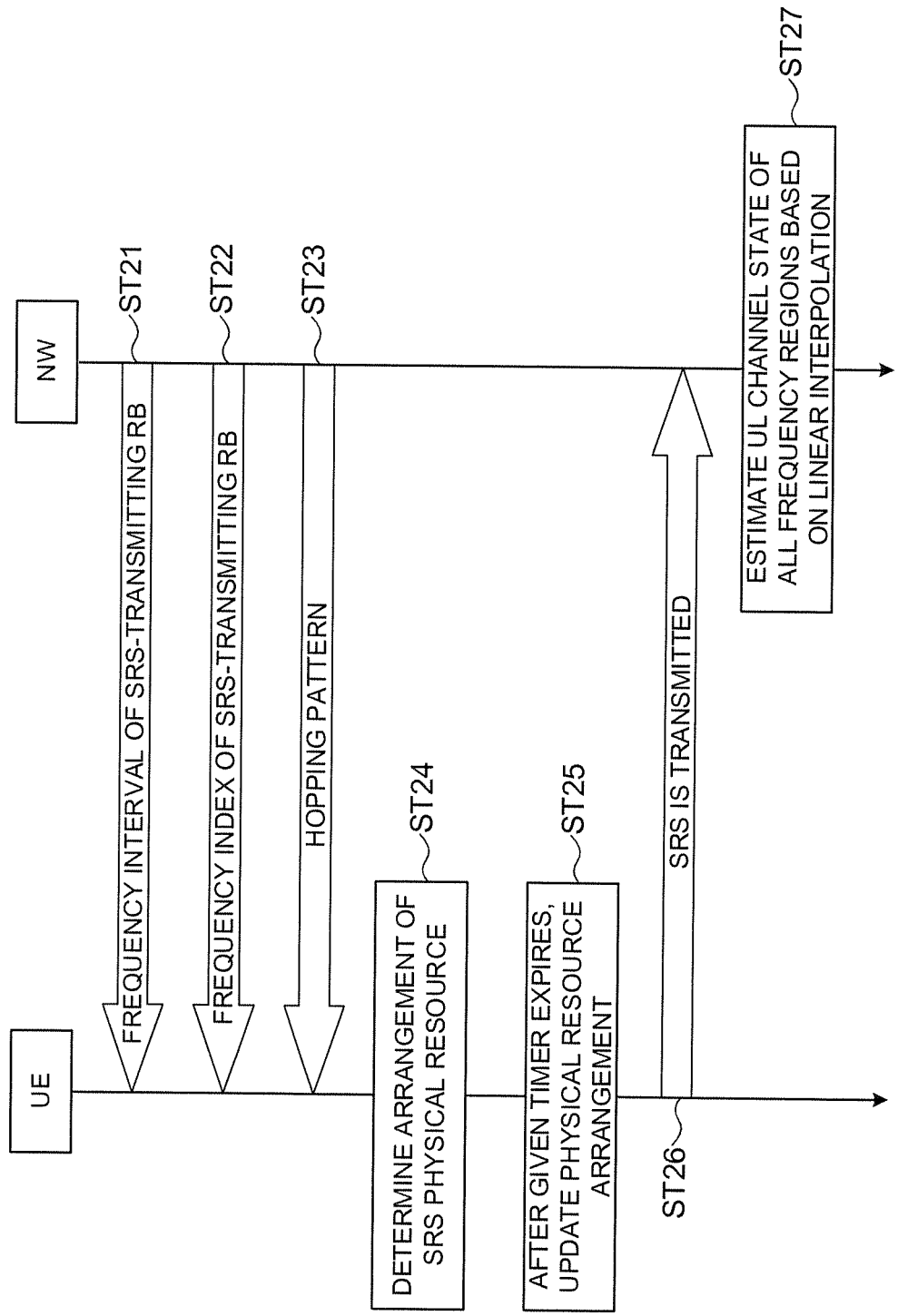
Figure 25:
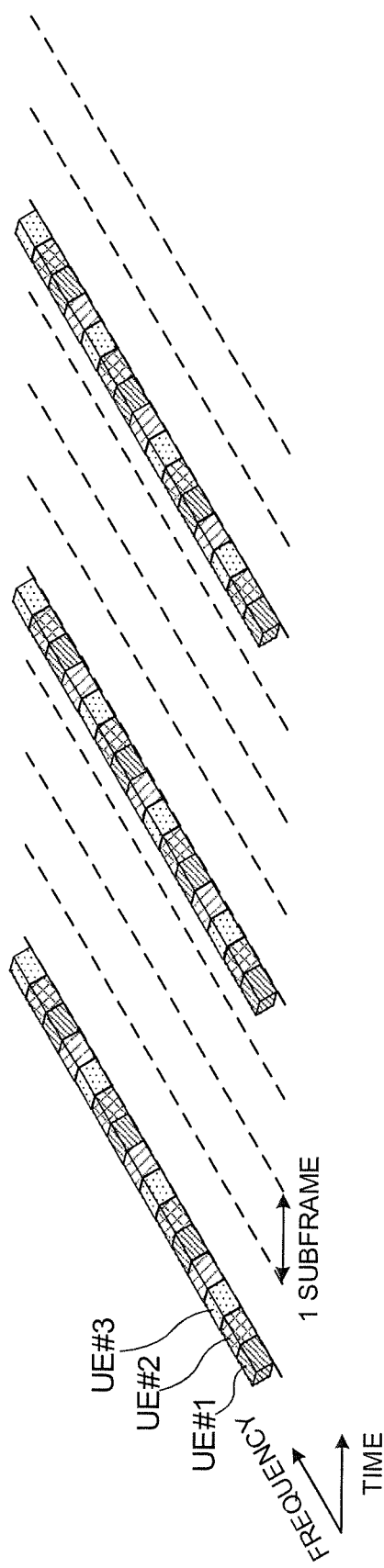
Figure 26:
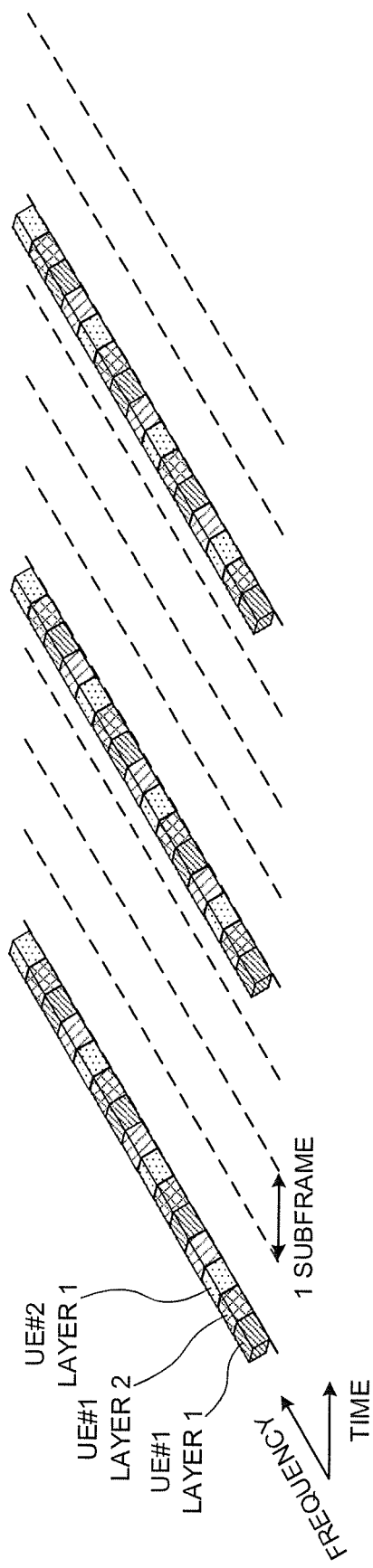
Figure 27:
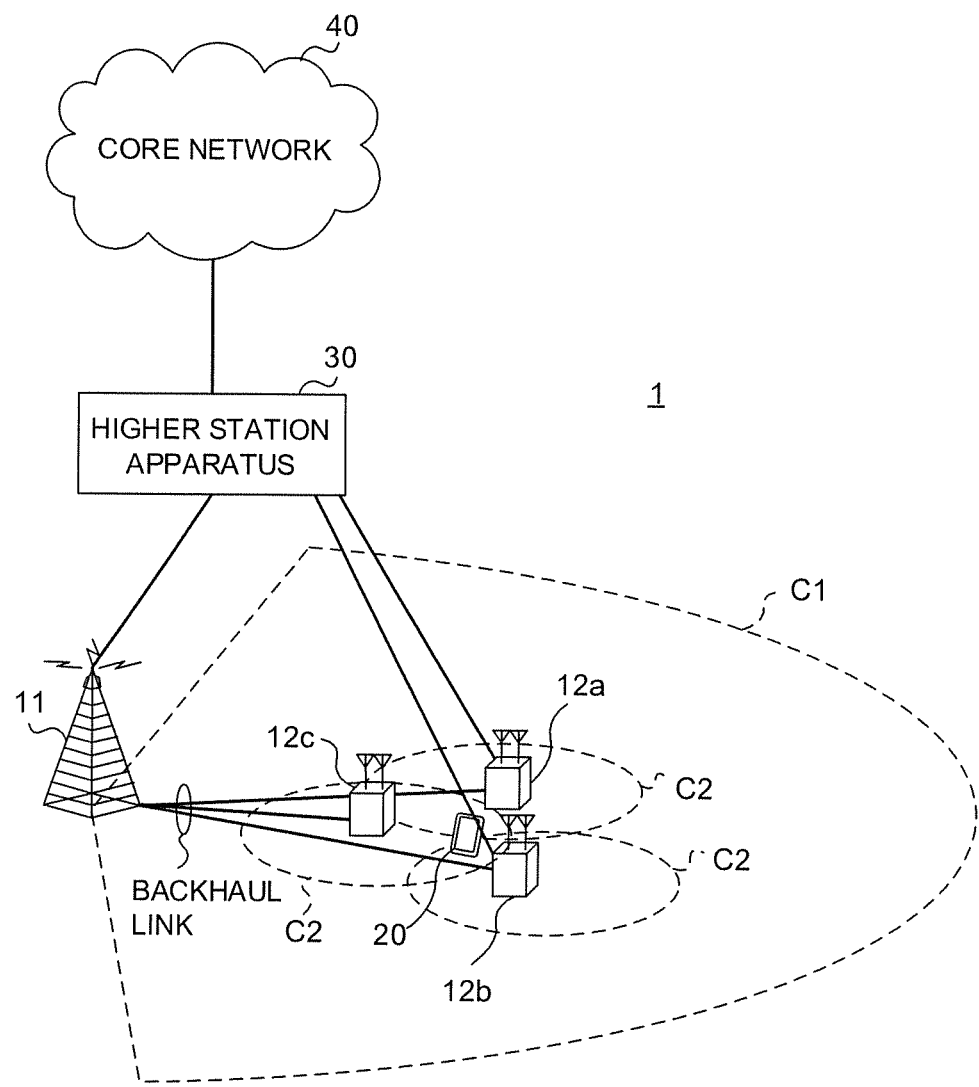
Figure 28:
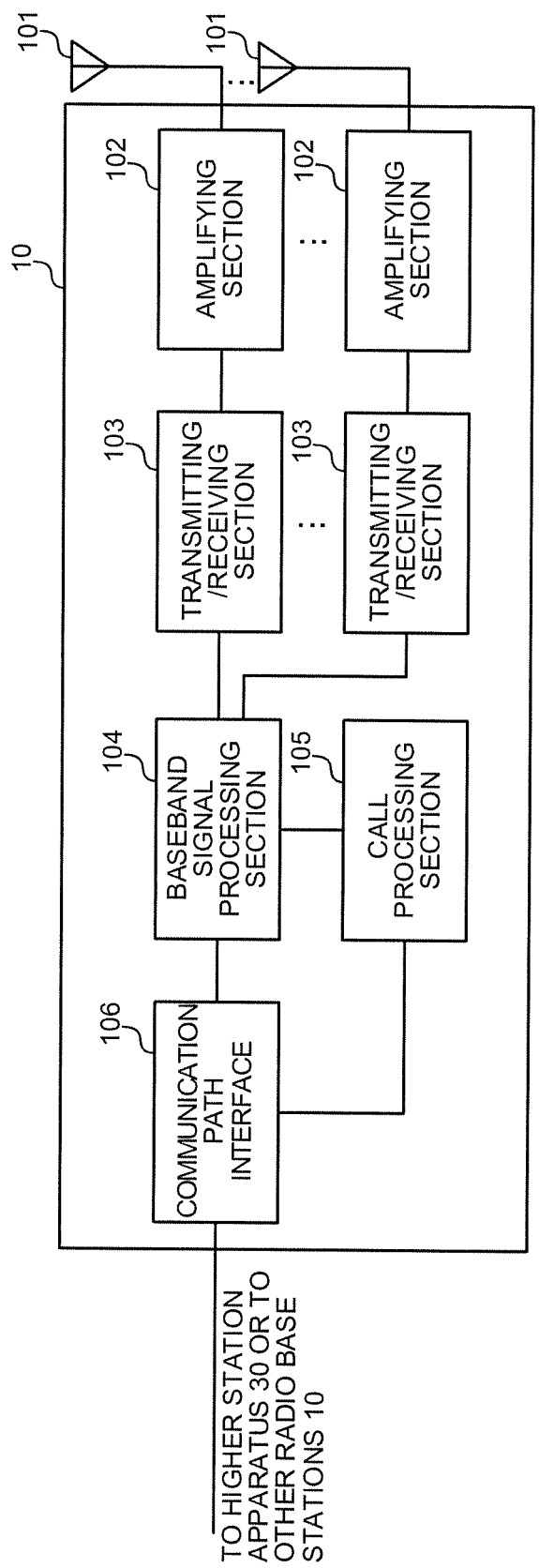
Figure 29:
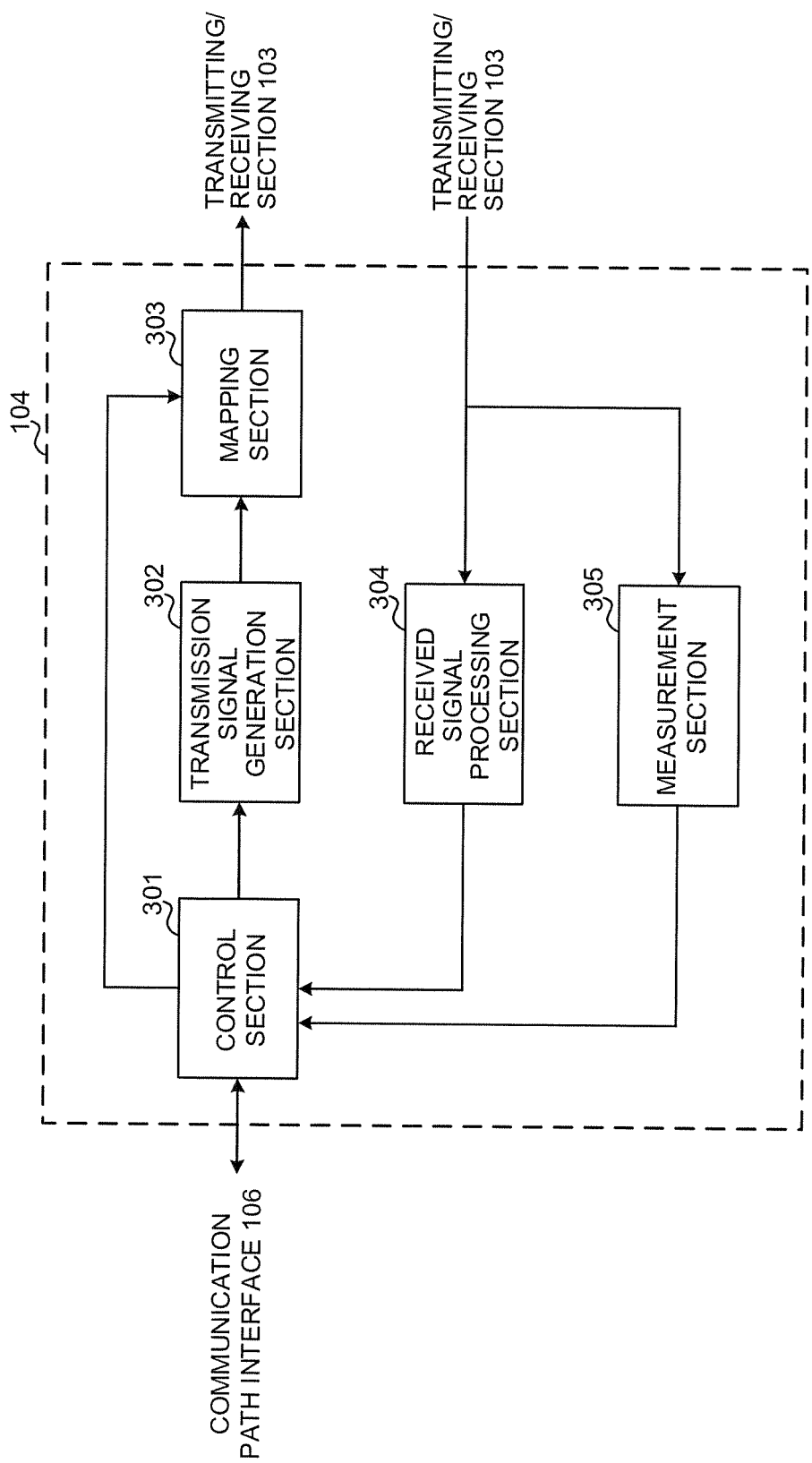
Figure 30:
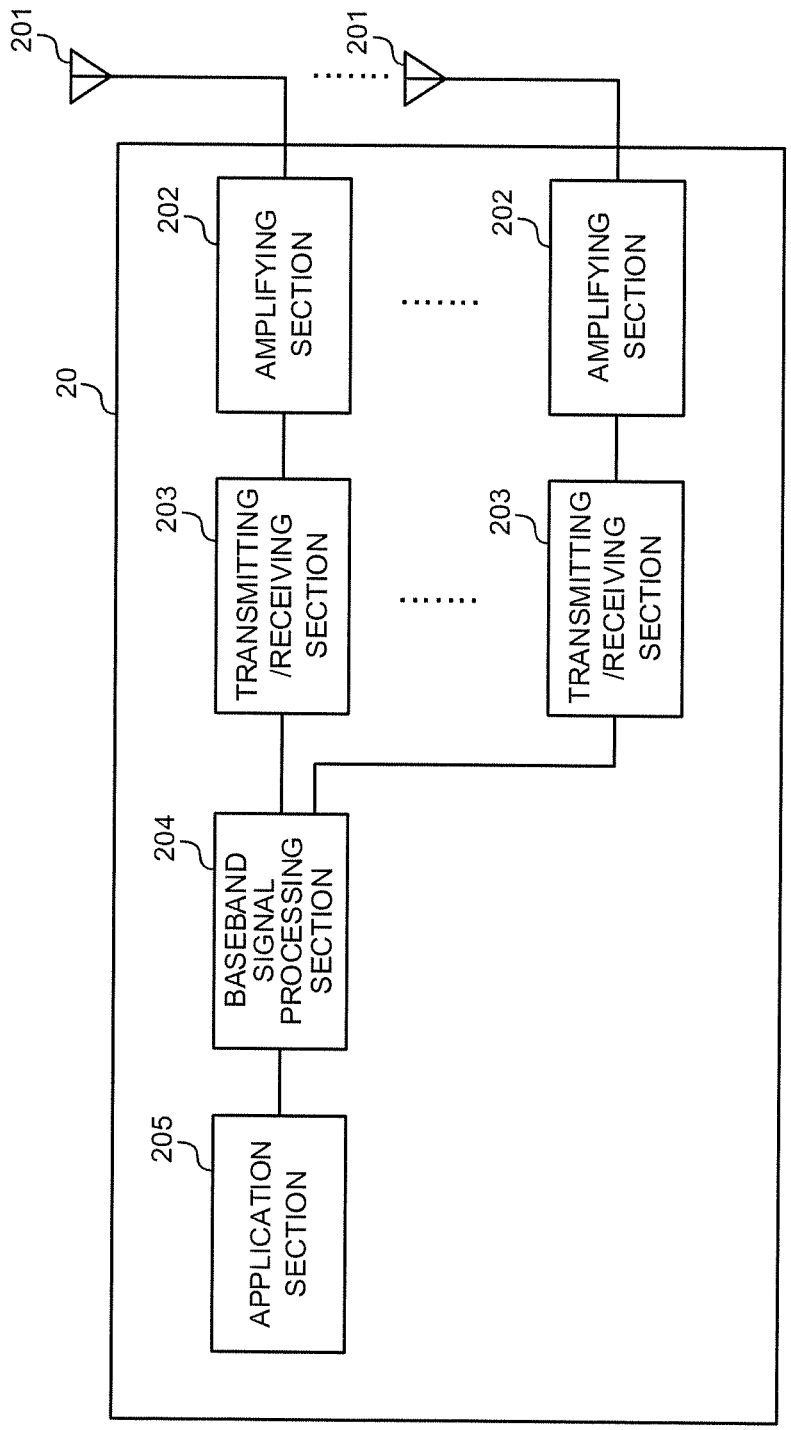
Figure 31:
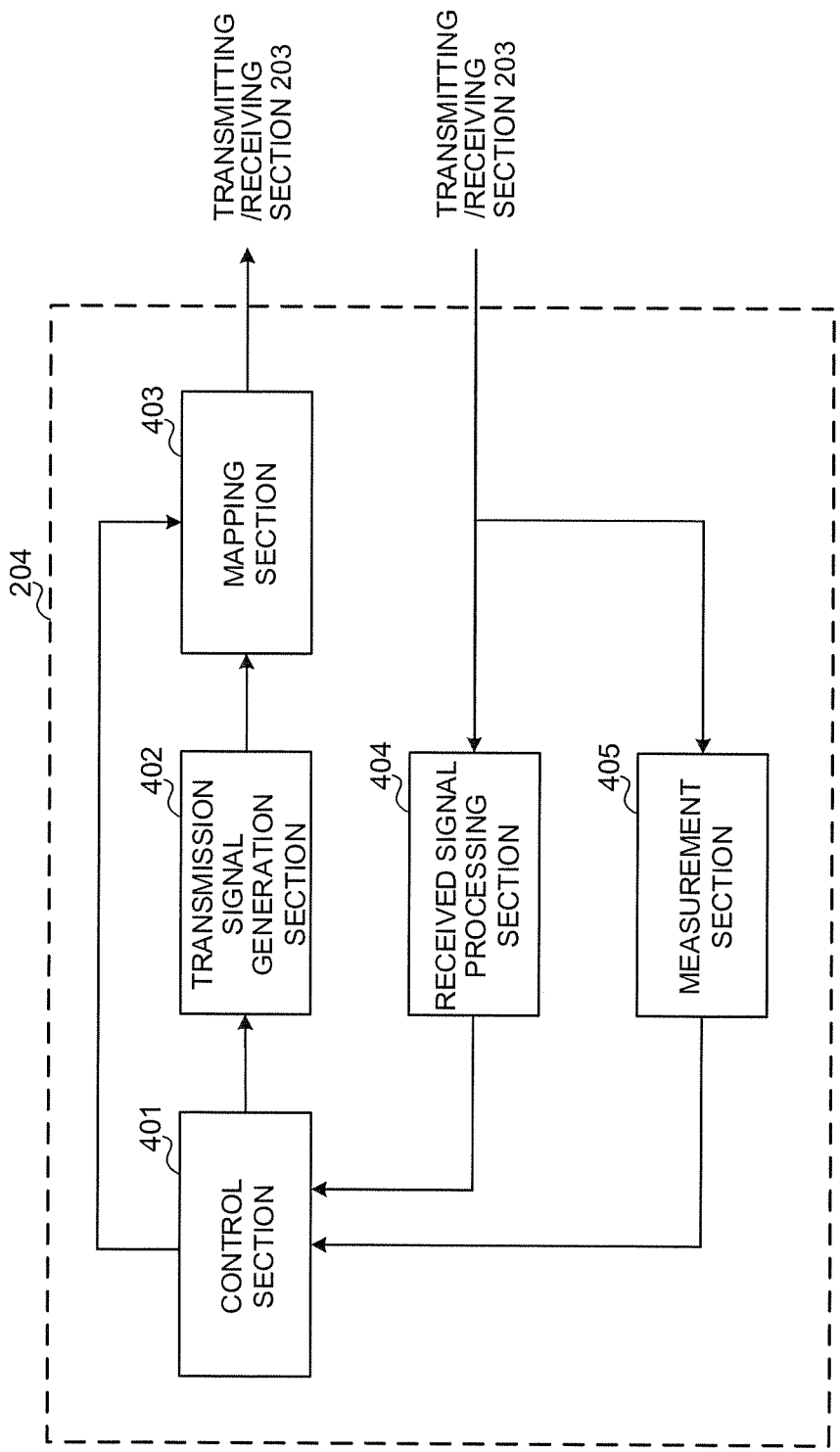
Figure 32:
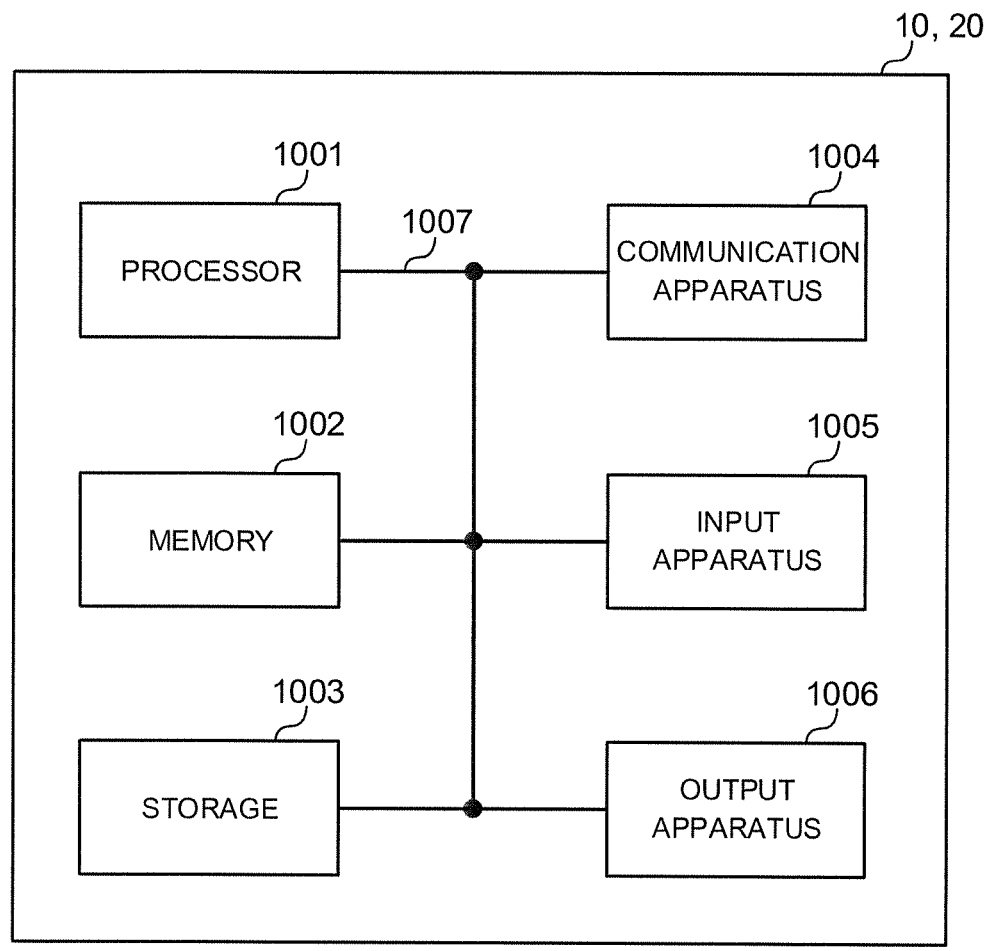

6B is a diagram to show an example of numerology information showing SRS CP duration;

FIG. 7A is a diagram to show an example of bandwidth information, and FIG. 7B is a diagram to show an example of CS sequence information;

FIG. 8A is a diagram to show a case where subframes that match specific period information are specified by a subframe number, and FIG. 8B is a diagram to show a case where subframes that match specific period information are specified by radio frame numbers and subframe numbers;

FIG. 9A shows an example of specific period information, and FIG. 9B is a diagram to show an example of relationship between numerology (subcarrier spacing) and subframe numbers;

FIG. 10 is a diagram to show an example of a flowchart showing an example of the operation of a user terminal according to the first aspect;

FIG. 11 is a diagram to show an example of multiplexing a plurality of user terminals having different numerologies according to the first aspect;

FIG. 12 is a diagram to show an example of the radio frame configuration according to the first aspect;

FIG. 13 is a diagram to show an example of the operation of a user terminal according to a second aspect;

FIG. 14 is a diagram to show another example of the operation of the user terminal according to the second aspect;

FIG. 15 is a diagram to show an example of multiplexing of a plurality of user terminals having different numerologies according to the second aspect;

FIG. 16 is a diagram to show an example of the radio frame configuration according to the second aspect;

FIG. 17 is a diagram to show another example of subframe information according to the second aspect;

FIG. 18 is a diagram to show an example of the SRS configuration according to the third aspect;

FIG. 19 is a diagram to show another example of the SRS configuration according to the third aspect;

FIG. 20 is a diagram to show an example of SRS-puncturing transmission according to the present embodiment;

FIG. 21A is a diagram to show another example of SRS-puncturing transmission according to the present embodiment, and FIG. 21B is a diagram to show an example of hopping command information;

FIG. 22 is a diagram to show an example of a channel estimation method for use upon SRS-puncturing transmission according to the present embodiment;

FIG. 23A is a diagram showing another example of SRS-puncturing transmission according to the present embodiment, and FIG. 23B is a diagram to show an example of a channel estimation method based on multiple SRS transmissions;

FIG. 24 is a diagram to show an example of operational procedures when performing SRS-puncturing transmission;

FIG. 25 is a diagram to show another example of SRS-puncturing transmission according to the present embodiment;

FIG. 26 is a diagram to show another example of SRS-puncturing transmission according to the present embodiment;

FIG. 27 is a diagram to show an example of a schematic structure of a radio communication system according to the present embodiment;

FIG. 28 is a diagram to show an example of an overall structure of a radio base station according to the present embodiment;

FIG. 29 is a diagram to show an example of a functional structure of a radio base station according to the present embodiment;

FIG. 30 is a diagram to show an example of an overall structure of a user terminal according to the present embodiment;

FIG. 31 is a diagram to show an example of a functional structure of a user terminal according to the present embodiment; and FIG. 32 is a diagram to show an example hardware structure of a radio base station and a user terminal according to the present embodiment.

DESCRIPTION OF EMBODIMENTS

Radio access schemes (5G RAT) for future radio communication systems are expected to introduce one or more numerologies (also referred to as "multiple numerologies," "multi-numerology," and others) in order to support wide frequency bands and various services with different requirements. Here, a "numerology" refers to a set of communication parameters (radio parameters) in the frequency and/or time direction. A set of communication parameters may include at least one of, for example, the subcarrier spacing, the bandwidth, the symbol duration, the CP duration, the TTI duration, the number of symbols per TTI, the radio frame configuration, the filtering process and the windowing process.

When "numerologies are different," this means that, for example, at least one of the subcarrier spacing, the bandwidth, the symbol duration, the CP duration, the TTI duration, the number of symbols per TTI and the radio frame configuration is different between numerologies, but this is by no means limiting. A future radio communication system that supports multiple numerologies is configured so that a plurality of user terminals with different numerologies can be accommodated.

Figure 1:
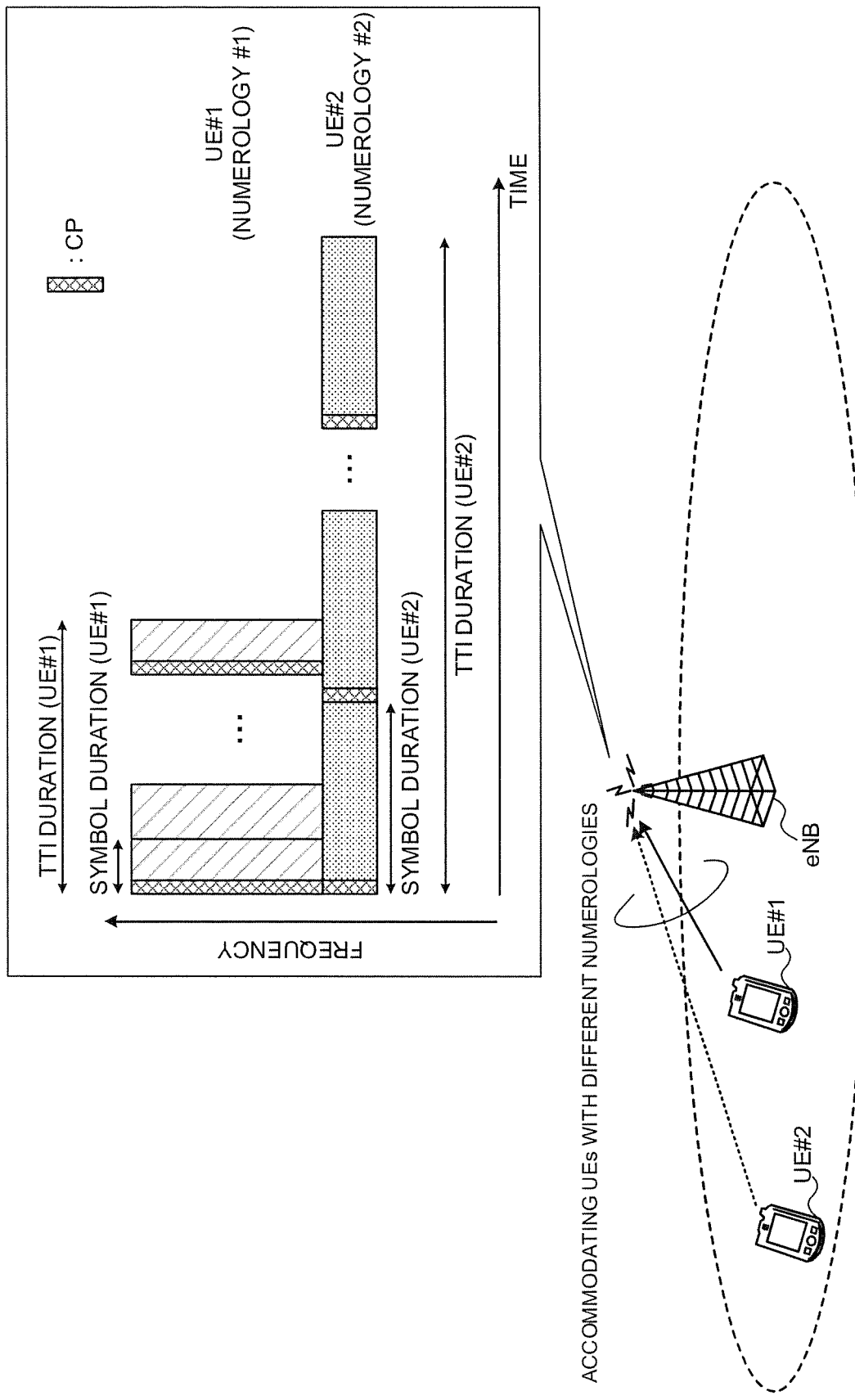
FIG. 1 is a diagram to show an example of a radio communication system supporting multiple numerologies.

FIG. 1 is a diagram to show an example of a radio communication system supporting multiple numerologies. Note that, although FIG. 1 illustrates numerologies #1 and #2 with different symbol durations and subcarrier spacings, as mentioned earlier, the types of numerologies are not limited to these. Also, FIG. 1 shows user terminals #1 and #2, but the number of user terminals (UE (User Equipment)) is not limited to two.

For example, FIG. 1 shows user terminal #2 to use numerology #2 with a relatively narrow subcarrier spacing (for example, 15 kHz), and user terminal #1 to use numerology #1 with a relatively wide subcarrier spacing (for example, 30 to 60 kHz). The subcarrier spacing of numerology #2 may be the same as the subcarrier spacing in existing LTE systems—that is, 15 kHz. The subcarrier spacing of numerology #1 may be N (N>1) times the subcarrier spacing of numerology #2.

Furthermore, subcarrier spacing and symbol duration are mutually reciprocal. Therefore, if the subcarrier spacing of numerology #1 is made N times the subcarrier spacing of numerology #2, the symbol duration in numerology #1 becomes 1/N of the symbol duration of numerology #2. Also, numerology #2 and numerology #1 may also have different structures of resource elements (REs), which are formed with subcarriers and symbols.

When the subcarrier spacing becomes wider, it is possible to effectively suppress the inter-channel interference caused by the Doppler shift when the user terminal moves and the communication quality degradation due to phase noise in the receiver of the user terminal. In particular, in high frequency bands such as several tens of GHz, the deterioration of communication quality can be effectively prevented by expanding the subcarrier spacing. Therefore, numerology #1, in which the subcarrier spacing is wider than in numerology #2, is suitable for communication in high frequency bands. In addition, by widening the subcarrier spacing, robustness for high-speed movement also improves, so that numerology #1, in which the subcarrier spacing is wider than in numerology #2, is suitable for high-speed movement.

Also, when the symbol duration becomes shorter, the TTI duration formed with a predetermined number (for example, fourteen or twelve) of symbols also becomes shorter, and so this is effective for reducing latency (latency reduction). In IoT (Internet of Things), MTC (Machine Type Communication), M2M (Machine To Machine), URLLC (Ultra-reliable and low latency communication) etc., although the amount of data is small, reduced latency is required. For such services that impose strict requirements on latency, numerology #1 with a shorter symbol duration than numerology #2 is suitable. Note that a TTI that is shorter than in existing LTE systems (for example, a TTI less than 1 ms) may be referred to as a "shortened TTI," a "short TTI," and so on.

Meanwhile, for services that require high spectral efficiency and high-speed communication, such as MBB (Mobile Broad Band) and others, numerology #2 with a narrow subcarrier spacing compared to numerology #1 is suitable. Numerology #2 is also suitable for massive MIMO (Massive Multiple-Input and Multiple-Output) using many antenna elements.

Although not shown, the number of symbols to constitute the TTI of each numerology may be the same as in existing LTE systems (for example, fourteen when the normal CP is used, twelve when an enhanced CP is used, and so on), or may be different. Furthermore, the unit of resource allocation (resource unit) in each numerology may be the same as or different from the resource block pair in existing LTE systems (which is, for example, twelve subcarriers×fourteen symbols, and also referred to as a "PRB (Physical Resource Block) pair"). A resource unit that is different from existing LTE systems may be referred to as an "enhanced RB (ERB)" and so on.

Furthermore, the symbols for use in each numerology may be OFDM (Orthogonal Frequency Division Multiplexing) symbols, or may be SC-FDMA (Single Carrier Frequency Division Multiple Access) symbols.

Also, although not shown, a format which makes the subcarrier spacing 1/N of existing LTE systems and makes the symbol duration N times as large may be another possible example of numerology. According to this format, the overall symbol duration increases, so that, even when the ratio of the CP duration to the overall symbol duration is constant, the CP duration can be lengthened. This enables radio communication that is more robust against fading on communication paths.

Furthermore, the numerologies for use by user terminals may be configured semi-statically via higher layer signaling, such as RRC (Radio Resource Control) signaling or broadcast information, or may be changed dynamically via L1/L2 control channels, for example.

In this way, when multiple user terminals with different numerologies can be accommodated in future radio communication systems, it may be possible to configure dedicated resources (for example, frequency resources and/or time resources) for each numerology.

Figure 2:
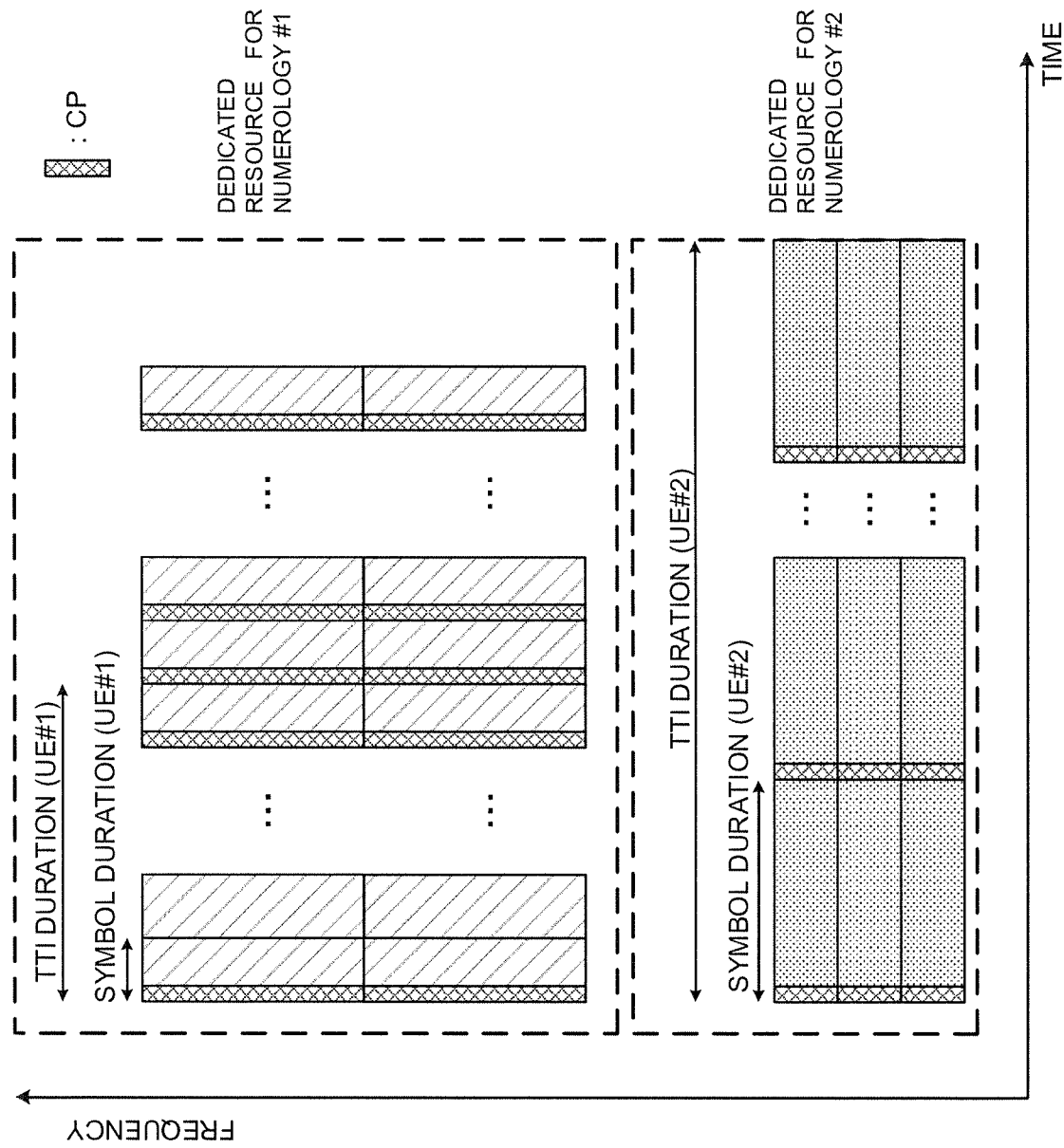
FIG. 2 is a diagram to show an example of configuring dedicated resources per numerology.

FIG. 2 is a diagram to show an example of configuring dedicated resources per numerology. In FIG. 2, the dedicated resources of numerology #1 and #2 are configured in mutually different frequency resources (for example, carriers, cells, component carriers (CCs), resource blocks (PRBs (Physical Resource Blocks), etc.)).

As shown in FIG. 2, to configure dedicated resources on a per numerology basis, it is necessary to provide (frequency and/or time) resources to serve as guards between each numerology's dedicated resources, and there is a possibility of guard loss. Also, numerology-specific dedicated resources may be use in different situations and conditions, and, for example, dedicated resources of a given numerology may be crowded, while dedicated resources of another numerology are not crowded.

In this way, when dedicated resources are configured on a per numerology basis, the efficiency of the use of radio resources may decrease. Therefore, rather than providing dedicated resources for each numerology, it is desirable to multiplex user terminals of different numerologies in the same carrier (CC, cell).

When multiplexing multiple user terminals with different numerologies configured in the same carrier, how to multiplex the UL reference signals (for example, SRS and/or DMRS) of the multiple user terminals is the problem. To be more specific, in order to perform frequency scheduling in UL, although it is desirable for the radio base station to be able to measure the UL channel quality of each user terminal throughout the carrier (CC, cell, etc.), when multiple user terminals with different numerologies are multiplexed in overlapping frequency resources of the same carrier, the question is how these multiple user terminals should transmit UL reference signals.

Therefore, the present inventors have studied the method of transmitting UL reference signals when multiplexing multiple user terminals with different numerologies in the same carrier, and arrived at the present invention. To be more specific, assuming there are multiple user terminals with different numerologies, the present inventors have come up with the idea of transmitting UL reference signals by coordinating the numerologies in specific symbols (first aspect), and transmitting UL reference signals by leaving the numerologies different as they are (second aspect).

Now, the present embodiment will be described below in detail. In the following description, the UL reference signals may be signals for use for UL channel quality measurement and/or UL channel estimation. The UL reference signals may include at least one of, for example, DM-RS, SRS and so on. Below, as an example, the case where SRS is applied will be explained.

Note that, although multiple numerologies with different subcarrier spacings and symbol durations will be exemplified below, the types of numerologies are not limited to these. Also, in a radio frame according to the present embodiment, UL reference signals of the same or different numerologies and UL and/or DL signals of different numerologies are multiplexed. To be more specific, within a radio frame, UL reference signals may be multiplexed not only with UL data but also with UCI (Uplink Control Information) or may be multiplexed with DL data and/or DCI (Downlink Control Information).

Figure 3:
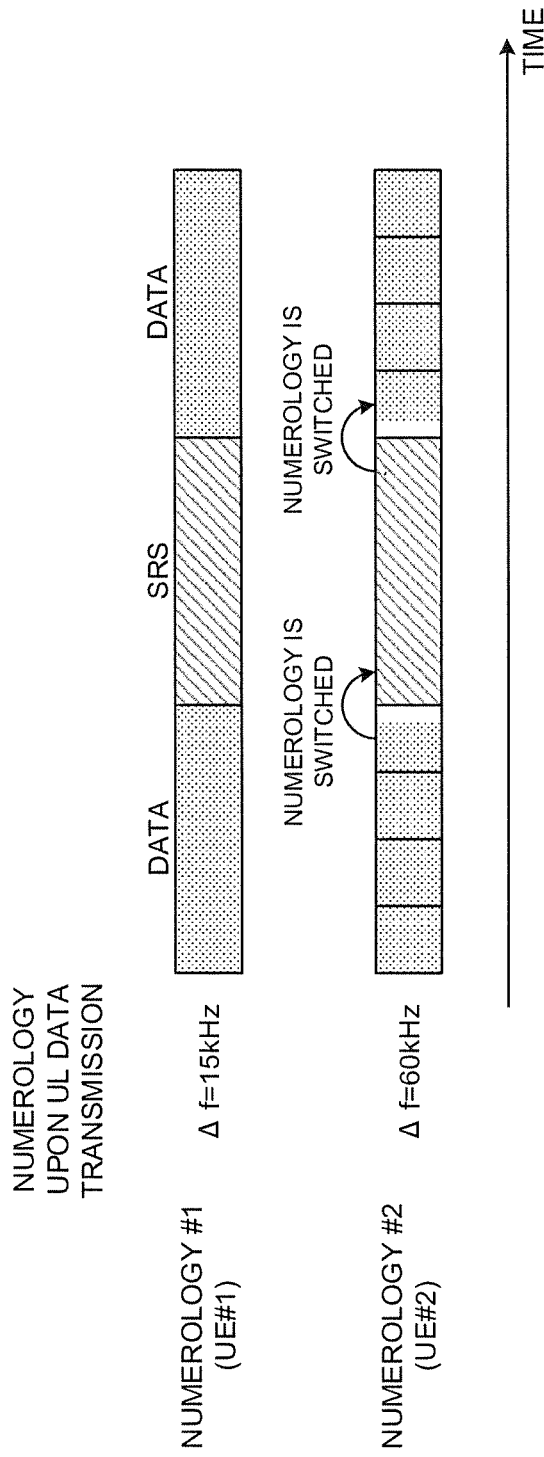
FIG. 3 is a diagram to show an example of SRS transmission according to the present embodiment (first aspect)
Figure 4:
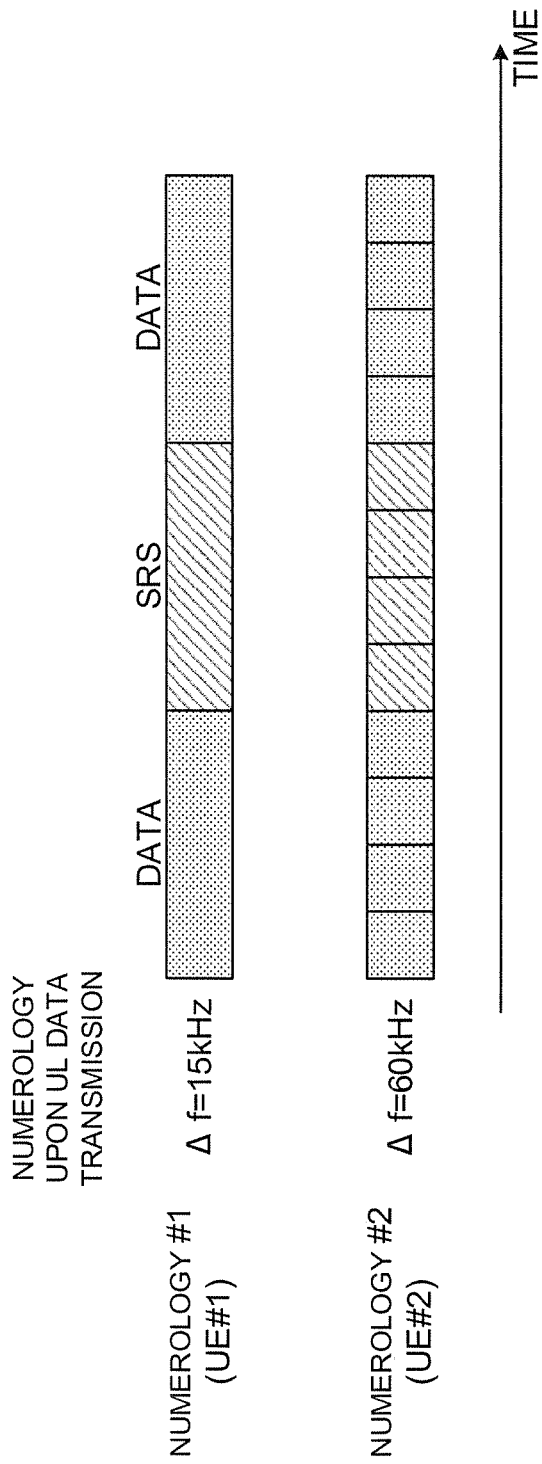
FIG. 4 is a diagram to show another example of SRS transmission according to the present embodiment (second aspect)

Referring to FIG. 3 and FIG. 4 now, examples of SRS transmission according to the present embodiment will be described. Note that FIG. 3 and FIG. 4 show numerology #1 with a subcarrier spacing (Of) of 15 kHz and numerology #2 with a subcarrier spacing of 60 kHz, but the types of numerologies are not limited to these. Subcarrier spacing and symbol duration are reciprocal to with each other, so that the symbol duration of numerology #2 is ¼ of the symbol duration of numerology #1 (for example, 1 ms).

In FIG. 3 and FIG. 4, user terminals #1 and #2 transmit UL data using different numerologies #1 and #2. As shown in FIG. 3 and FIG. 4, by making the subcarrier spacing and the symbol duration of numerology #1 the same as in existing LTE systems, backward compatibility with existing LTE systems can be maintained.

FIG. 3 provide diagrams to show examples of transmission of SRSs according to the first aspect. As shown in FIG. 3, according to the first aspect, user terminals #1 and #2 coordinate the numerologies in a specific period and transmit SRSs during the specific period (for example, symbols). For example, in FIG. 3, user terminal #2 switches the numerology in a specific period from numerology #2 to numerology #1, and transmits an SRS in the specific period by using numerology #1.

FIG. 4 is a diagram to show an example transmission of SRSs according to the second aspect. Referring to FIG. 4, according to the second aspect, user terminals #1 and #2 transmit SRSs during a specific period coordinating the numerologies in this specific period (for example, symbols). For example, in FIG. 4, user terminal #1 transmits an SRS using numerology #1 in a specific period, and user terminal #2 transmits an SRS using numerology #2 during the specific period.

As shown in FIG. 3 and FIG. 4, SRSs of a plurality of user terminals having different numerologies are multiplexed by coordinating the numerologies in a specific period (first aspect), or without coordinating the numerologies (second aspect), so that multiple user terminals with different numerologies can be properly accommodated in the same carrier. Hereinafter, SRS transmission methods according to the first and second aspects will be described in detail.

First Aspect

According to the first aspect, in a specific period, a plurality of user terminals with different numerologies transmit SRSs using the same numerology.

To be more specific, the user terminal receives information (hereinafter referred to as "SRS information") on the SRS described later, and controls SRS transmission in a specific period based on the SRS information. For example, if the numerology for SRS indicated from the network (for example, a radio base station (eNB (eNodeB))) is different from the numerology for UL data, the user terminal may switch the numerology to the numerology for SRS in a specific period and send SRS.

Figure 5:
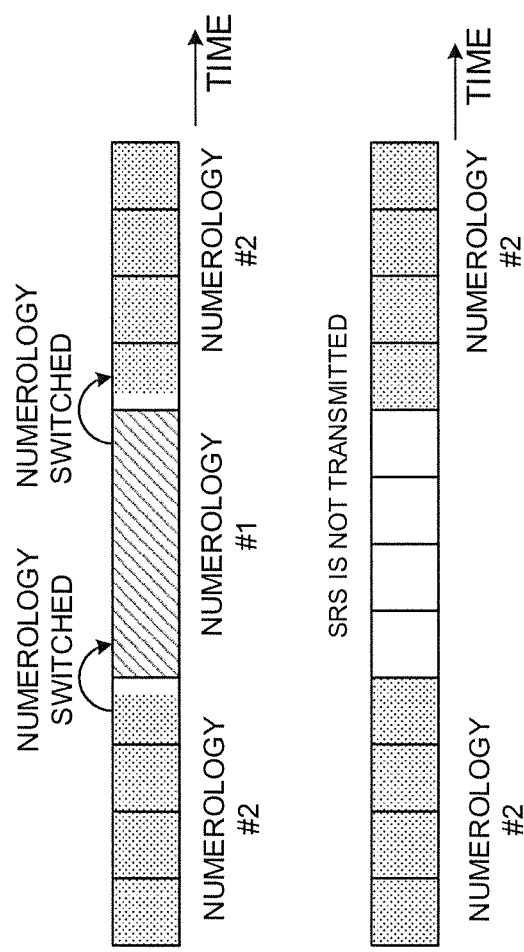
FIG. 5 is a diagram to show an example of switching numerology according to a first aspect of the present invention.

FIG. 5 is a diagram to show an example of switching numerology according to the first aspect. In FIG. 5, as numerology for SRS, it is assumed that numerology #1 with a subcarrier spacing of 15 kHz is instructed by the user terminal.

In FIG. 5, user terminal #2, which transmits UL data using numerology #2 with a subcarrier spacing of 60 kHz, may switch the numerology from numerology #2 to numerology #1 in a specific period, and transmit the SRS using numerology #1.

For example, in FIG. 5, by switching from numerology #2 having a subcarrier spacing of 60 kHz to numerology #1 having a subcarrier spacing of 15 kHz, the symbol duration for SRS transmission is four times the symbol duration for UL data transmission. As a result, the TTI duration for SRS transmission also becomes four times the TTI duration for UL data transmission. Therefore, the switching of numerology in a specific period can be paraphrased as switching of the TTI duration (in FIG. 5, switching from a shortened TTI to a normal TTI).

Also, as shown in FIG. 5, when user terminal #2 transmits the SRS in a specific period, user terminal #2 may switch the numerology by stopping transmission and/or receipt in a predetermined period (for example, a predetermined number of symbols) immediately before and/or immediately after the specific period.

Meanwhile, when user terminal #2 does not transmit the SRS in the specific period, user terminal #2 does not have to switch the numerology. In this case, user terminal #2 does not have to stop transmission and/or receipt in a predetermined period immediately before and/or immediately after the specific period.

Note that the above specified period may be configured by at least one of higher layer signaling (for example, RRC signaling), broadcast information (for example, the MIB (Master Information Block) or SIBs (System Information Blocks)), and physical layer signaling (for example, downlink control information (DCI (Downlink Control Information))). Also, whether or not to transmit the SRS in the specific period may be configured by higher layer signaling or broadcast information (for example, periodic SRS), or may be commanded by physical layer signaling (for example, aperiodic SRS).

<SRS Information>

Next, SRS information used for SRS transmission control in a specific period in the first aspect will be described in detail. The SRS information related to the SRS is signaled (reported) from the network (for example, a radio base station) to the user terminal by at least one of physical layer signaling, higher layer signaling and broadcast information.

Here, the SRS information may include at least one of numerology information, which shows the numerology for SRS, bandwidth information, which shows the transmission bandwidth of the SRS, CS sequence information, which indicates the cyclic shift (CS) sequence (phase rotation amount) used to transmit the SRS, specific period information, which indicates a specific period that is used to transmit the SRS, and comb information indicating comb (comb tooth shape subcarrier) used to transmit the SRS FIG. 6 is a diagram to show an example of numerology information according to the first aspect. The numerology information indicates communication parameters (for example, at least one of the subcarrier spacing, the symbol duration, the CP duration, the TTI duration, the number of symbols per TTI and the radio frame configuration) in the frequency direction and/or the time direction used to transmit the SRS.

As for the numerology information, (1) candidate values may be reported by higher layer signaling or broadcast information, and one of the candidate values may be designated by physical layer signaling, (2) the numerology information may be configured by higher layer signaling or broadcast information, or (3) the numerology information may be specified by physical layer signaling.

In FIG. 6A, an example of numerology information representing SRS subcarrier spacing is shown. As shown in FIG. 6A, the numerology information may be a bit value indicating a subcarrier spacing that is N times (N≥1) the subcarrier spacing of subcarrier spacing of 15 kHz in existing LTE systems.

For example, in FIG. 6A, four kinds of bit values to represent four kinds of subcarrier spacings (15 kHz, 30 kHz, 60 kHz and 120 kHz), respectively, are configured by higher layer signaling or broadcast information, and a bit value to represent the subcarrier spacing selected for the SRS is specified by physical layer signaling, but this is by no means limiting. The subcarrier spacing for the SRS may be specified by either higher layer signaling, broadcast information or physical layer signaling.

Also, since symbol duration and subcarrier spacing are reciprocal to each other, if the subcarrier spacing of SRS is indicated, signaling of symbol duration can be omitted. For example, by setting a symbol duration of subcarrier spacing of 15 kHz (for example, 1 ms), symbol duration of other subcarrier spacing (30 kHz, 60 kHz, 120 kHz) can be derived. Note that although not shown, signaling of subcarrier spacing may be omitted by indicating symbol duration of SRS by numerology information.

An example of numerology information showing SRS CP duration is shown in FIG. 6B. As shown in FIG. 6B, the numerology information may be a bit value to indicate the CP duration of the SRS. For example, in FIG. 6B, four kinds of bit values to represent four kinds of CP durations (0.1 μs, 0.5 μs, 1.0 μs and 5.0 μs) are configured by higher layer signaling, and a bit value to indicate the CP duration selected for the SRS is specified by physical layer signaling, but this is by no means limiting. The CP duration for the SRS may be specified by either higher layer signaling, broadcast information or physical layer signaling.

FIG. 7 is a diagram to show an example of bandwidth information and CS sequence information according to the first aspect. As shown in FIG. 7A, the bandwidth information may be a bit value to indicate the transmission bandwidth of the SRS. The transmission bandwidth of the SRS may be at least a part of the system bandwidth. In FIG. 7A, four kinds of bit values to represent four kinds of transmission bandwidths (bw 0 to bw 3) are configured by higher layer signaling, and a bit value to indicate the transmission bandwidth selected for the SRS is specified by physical layer signaling, but this is by no means limiting. The transmission bandwidth for the SRS may be specified by one of higher layer signaling, broadcast information and physical layer signaling.

As shown in FIG. 7B, the CS sequence information may be a bit value indicating a CS sequence to be used for SRS transmission. In FIG. 7B, eight bit values indicating eight types of transmission bandwidths (Cs 0 to Cs 7) are configured by higher layer signaling, and a bit value to indicate the CS sequence selected for the SRS is specified by physical layer signaling, but this is by no means limiting. The CS sequence for the SRS may be specified by either higher layer signaling, broadcast information or physical layer signaling. By applying CS to SRS, the SRS of multiple user terminals can be multiplexed to the same time and frequency resources.

FIG. 8 is a diagram to show an example of specific period information according to the first aspect. The specific period information indicates a specific period (for example, subframe, TTI, symbol, etc.) of time used for transmitting the SRS. FIG. 8A shows a case where each symbol is uniquely specified by a symbol number. In FIG. 8A, the specific period information may indicate the symbol number itself (for example, "30" and "36" in FIG. 8A) of a specific symbol.

Alternatively, the specific period information may be information (hereinafter referred to as "derivation information") used for deriving (derive) (calculation) the symbol number of a specific symbol. The derivation information may be "quotient (divisor)" and/or "remainder" when dividing the symbol number. For example, in FIG. 8A, as the derivation information of the symbol numbers "30" and "36", the divisor "6" and the remainder "0" may be indicated by the specific period information. Alternatively, only the divisor "6" is indicated by the specific period information as derived information, the remainder "0" may be predetermined by specification in advance.

Meanwhile, FIG. 8B shows a case where each symbol is uniquely specified by a subframe number (TTI number) and a symbol number. In FIG. 8B, as an example, there is shown a case where six symbols are provided in a subframe (TTI) and symbol numbers #1 to #6 are added, an example in which the number of symbols in the subframe and the symbol number are given is not limited to that shown in FIG. 8B.

In FIG. 8B, the specific period information may be only the symbol numbers (for example, "6" in FIG. 8B), or the subframe number and a symbol number.

The specific period information as described above is signaled by at least one of higher layer signaling, broadcast information and physical layer signaling. Also, the specific period information as described above may be signaled per numerology or may be signaled only for the reference numerology (for example numerology #1 for SRS).

FIG. 9 is a diagram to show another example of specific period information according to the first aspect. FIGS. 9A and 9B show how the user terminal of the other numerology derives the specific period when the specific period information is signaled only for the reference numerology.

As an example, FIG. 9A shows a case where numerology #1 with a subcarrier spacing of 15 kHz and numerology #3 with a subcarrier spacing of 30 kHz are multiplexed in the same carrier. In this case, the symbol duration of numerology #3 is ½ of the symbol duration of numerology #1, so that two symbols of numerology #3 are included in one symbol of numerology #1.

In FIG. 9A, the symbol number "6" of numerology #1 is designated by the specific period information. In this case, using information about associations between subcarrier spacing (numerology) and symbol number shown in FIG. 9B, the user terminal using numerology #3 may derive a specific period for use for transmitting the SRS. For example, since the subcarrier spacing of numerology #3 is 30 kHz, based on symbol numbers 2X−1, 2X associated with the subcarrier spacing 30 kHz in FIG. 9B, the subframe of symbol numbers 11 and 12 may be derived as the above-mentioned specific period.

Although FIG. 9 illustrates a case (FIG. 8B) where each symbol is uniquely specified by a subframe number and a symbol number, even when each symbol is uniquely specified by a symbol number (FIG. 8A), the subframe number of numerology #3 may be derived using the same association as in FIG. 9B.

Further, the relationship between subframes and symbols in FIG. 8 and FIG. 9 may be replaced with the relationship between radio frames and subframes. In this case, the specific period information may be information indicating the subframe number itself of a specific subframe, or may be information for deriving the corresponding subframe number.

<User Terminal Operation>

Next, the operation of the user terminal in the first aspect will be described in detail. FIG. 10 is a flowchart showing an example of the operation of a user terminal according to the first aspect. In FIG. 10, it is assumed that numerology #2 with a subcarrier spacing of 60 kHz is configured in the user terminal with higher layer signaling or broadcast information. Also, as explained in FIG. 8 and FIG. 9, it is assumed that the specific period used for transmitting the SRS is configured (and/or designated) for the user terminal.

In step ST 11 of FIG. 10, the user terminal receives numerology information indicating numerology #1 from the network. For example, as the numerology information, the user terminal may receive the bit value "00" indicating the subcarrier spacing of 15 kHz via physical layer signaling (see FIG. 6A).

In step ST 12, the user terminal determines whether or not to transmit the SRS in a specific period. For example, whether or not to transmit the SRS in the specific period may be indicated to the user terminal by physical layer signaling. When SRS is not transmitted in a specific period (step ST 12: NO), this operation ends.

When SRS is transmitted in a specific period (step ST 12: YES), in step ST 13, the user terminal judges whether the numerology information received in step ST 11 indicates numerologies different from numerology #2 configured in the user terminal.

When the numerology information received in step ST 11 indicates numerology #2 configured in the user terminal (step ST 13: NO), in step ST 14, the user terminal transmits the SRS using numerology #2 in a specific period, and ends this operation.

Meanwhile, if the numerology information received in step ST 11 indicates numerologies #1, which is different from numerology #2 configured in the user terminal (step ST 13: YES), in step ST15, the user terminal switches the numerology from numerology #2 to numerology #1 in a specific period (see FIG. 5).

In step ST 16, the user terminal transmits the SRS in a specific period using the switched numerology #1. When the user terminal finishes transmitting the SRS in a specific period, in step ST 17, the user terminal switches again the numerology from numerology #1 for the SRS to numerology #2 configured for the user terminal.

FIG. 11 is a diagram to show an example of multiplexing a plurality of user terminals having different numerologies according to the first aspect. FIG. 11 shows a case where user terminal #1 of numerology #1 having a subcarrier spacing of 15 kHz, user terminal #3 of numerology #3 having a subcarrier spacing of 30 kHz, and user terminal #2 of numerology #2 having a subcarrier spacing of 60 kHz are multiplexed in the same carrier.

In FIG. 11, to user terminals #1 to #3 where numerology #1 to #3 are configured, a specific period is provided, each used to transmit the SRS (see FIG. 8 and FIG. 9), and as the numerology for the SRS, numerology information indicating numerology #1 is reported.

In the specific period of FIG. 11 the SRSs of user terminals #1 to #3 transmitted using numerology #1 may be multiplexed by at least one of code division multiplexing (for example different CS sequences), comb, frequency division multiplexing, time division multiplexing, and puncturing transmission described later. In this way, when transmitting the SRSs of user terminals #1 to #3 by coordinating the numerologies in a specific period, since more multiplexing methods can be used, so that more SRSs can be multiplexed in a specific period.

Note that, as shown in FIG. 11, when switching the numerology in a specific period and transmitting the SRS, during a predetermined period before and after the specific period, the user terminal may switch the numerology by interrupting transmission and/or receipt. Also, when SRS is not transmitted in a specific period, it is not necessary to switch numerology. In this case, there may be no interruption period for transmission and/or receipt before and after a specific period.

<Transmission Power of SRS>

According to the first aspect, the transmission power of the SRS transmitted within a certain period is described. The user terminal may determine the transmission power of the SRS based on at least one of the maximum transmission power of the user terminal, a predetermined offset that is configured by higher layer signaling, the SRS transmission bandwidth, a parameter related to the target received power, weighting coefficient of fractional TPC, path loss, and correction value by TPC command. For example, the user terminal may determine the transmission power of the SRS based on following equation 1.

$$P_{SRS,c}(i) = \min\{P_{CMAX,c}(i), P_{SRS\_OFFSET,c}(m) + 10 \log (M_{SRS,c}) + P_{O\_PUSCH,c}(j) + \alpha_c(j) \cdot PL_c + f f_c(i)\} [dBm] \quad \text{(Equation 1)}$$

Here, $P_{CMAX,c}(i)$ is the maximum transmission power of the user terminal. $P_{SRS\_OFFSET,c}(m)$ is a predetermined offset that is configured by higher layer signaling. $M_{SRS,c}(i)$ is the bandwidth (for example, the number of resource blocks) for SRS allocated to the user terminal. $P_{O\_PUSCH,c}(j)$ is a parameter (for example, a parameter related to transmission power offset) (hereinafter referred to as target received power parameter) relating to the target received power (target reception SNR (Signal to Noise Ratio)). $\alpha_c(j)$ is the weight coefficient of the fractional TPC. $PL_c$ is path loss (propagation loss). $f_c(i)$ is a correction value by the TPC command.

Note that above $P_{CMAX,c}(i)$, $M_{PUSCH,c}(i)$, $P_{O\_PUSCH,c}(j)$, $\alpha_c(j)$, $PL_c$, $\Delta_{TF,c}(i)$ and $f_c(i)$ may be expressed simply as $P_{CMAX}$, $M_{PUSCH}$, $P_{O\_PUSCH}$, $\alpha$, $PL$, $\Delta_{TF}$, and $f$, by excluding cell c, subframe i and a predetermined subscript j.

<Structure of Radio Frame>

Next, an example of a configuration of a radio frame in which a plurality of user terminals with different numerologies are multiplexed will be described. FIG. 12 is a diagram to show an example of a configuration of a radio frame according to a first aspect. FIG. 12 shows a case where user terminal #1 of numerology #1 having a subcarrier spacing of 15 kHz, user terminal #2 of numerology #2 having a subcarrier spacing of 60 kHz and user terminals #3 and #4 of numerology #3 having a subcarrier spacing of 30 kHz are multiplexed in the same carrier.

In FIG. 12, the UL data (and/or DL data) of user terminals #1 to #4 is frequency-division-multiplexed with a subframe duration (TTI duration) corresponding to each numerology (subcarrier spacing). Meanwhile, the SRSs of user terminals #1 to #4 are multiplexed with the same numerology in a specific period by at least one of code division multiplexing (for example, CS), comb, frequency division multiplexing, time division multiplexing, and puncturing transmission.

In FIG. 12, user terminal #1 uses numerology #1 for both UL data transmission (and/or DL data receipt) and SRS transmission, so that transmission and/or receipt is not interrupted in a predetermined period before and after the SRS transmission period.

Meanwhile, user terminals #2 to #4 transmit UL data (and/or receive DL data) using numerologies #2 to #4, respectively, while using numerology #1 to transmit SRS. For this reason, transmission and/or receipt are interrupted in a predetermined period before and after the SRS transmission period, and the numerology is switched.

In FIG. 12, user terminal #3 does not transmit the SRS during the second SRS transmission period. Therefore, user terminal #3 does not suspend transmission and/or receipt in a predetermined period before the second SRS transmission period.

Second Aspect

In a second aspect, a plurality of user terminals transmit SRSs in a specific period using different numerologies respectively configured for these multiple user terminals.

To be more specific, each user terminal receives SRS information and controls SRS transmission in a specific period based on the SRS information. According to the second aspect, the SRS information may include at least one of the bandwidth information, the CS sequence information, the comb information, and the specific period information. According to a second aspect, the numerology configured in the user terminal is not switched and the SRS is transmitted in a specific period, so that SRS information does not have to include numerology information.

Hereinafter, the SRS information in the second aspect is the same as the first aspect except that it does not need to include numerology information, and so the description will be omitted. Also, the transmission power of the SRS is controlled in the same manner as in the first aspect, so that the description will be omitted in the second aspect.

<User Terminal Operation>

An example of user terminal operation according to the second aspect will be described. In the second aspect, each user terminal transmits SRS and/or UL data in a specific period.

FIG. 13 and FIG. 14 are diagrams to show examples of the operation of a user terminal according to the second aspect. In FIG. 13 and FIG. 14, for the user terminal, it is assumed that numerology #2 with a subcarrier spacing of 60 kHz is configured by higher layer signaling or broadcast information. Also assume that the user terminal is configured (and/or designated) with a specific period that is used to transmit the SRS as described in FIG. 8 and FIG. 9.

As shown in FIG. 13 and FIG. 14, a user terminal configured with numerology #2 transmits UL data and/or the SRS using numerology #2 in at least one subframe (TTI) in a specific period. To be more specific, in at least one subframe in a specific period, the user terminal may transmit only the SRS, or transmit the SRS and UL data, or may transmit only UL data.

For example, in FIG. 13, the user terminal transmits UL data and/or the SRS in all subframes in a specific period. Meanwhile, FIG. 14, the user terminal transmits UL data and/or the SRS in a part of a specific period. In FIG. 14, in the subframe in which the user terminal does not transmit the UL data and/or the SRS, another user terminal's UL data and/or SRS may be transmitted.

FIG. 15 is a diagram to show an example of multiplexing a plurality of user terminals having different numerologies according to the second aspect. FIG. 15 shows a case where user terminal #1 of numerology #1 with a subcarrier spacing of 15 kHz, user terminal #3 of numerology #3 with a subcarrier spacing of 30 kHz and user terminal #2 of numerology #2 with a subcarrier spacing of 60 kHz are multiplexed in the same carrier.

In FIG. 15, for each of user terminals #1 to #3 for which numerology #1 to #3 are configured, there is a specific period used for transmitting the SRS (see FIG. 8 and FIG. 9), in this specific period, SRSs of user terminals #1 to #3 are transmitted using different numerologies #1 to #3.

SRSs of user terminals #1 to #3 transmitted using different numerologies #1 to #3 during the specific period of FIG. 15 can be multiplexed by at least one of frequency division multiplexing, time division multiplexing, and a puncturing transmission described later. As described above, when transmitting SRSs of user terminals #1 to #3 without coordinating the numerologies in a specific period, there is no need to switch the numerology, and there is no need to provide a period for suspending transmission and/or receipt, so that control of the user terminal can be simplified.

<Structure of Radio Frame>

Next, an example of a configuration of a radio frame in which a plurality of user terminals having different numerologies are multiplexed will be described. FIG. 16 and FIG. 17 are diagrams to show an example of a configuration of a radio frame according to a second aspect. FIG. 16 and FIG. 17 show the case where user terminal #1 to use numerology #1 with a subcarrier spacing of 15 kHz, user terminal #2 to use numerology #2 with a subcarrier spacing of 60 kHz and user terminals #3 and #4 using numerology #3 with a subcarrier spacing of 30 kHz are multiplexed in the same carrier.

In FIG. 16 and FIG. 17, UL data (and/or DL data) of user terminals #1 to #4 is frequency-division-multiplexed in a subframe duration (TTI duration) corresponding to each numerology (subcarrier spacing). The SRSs of user terminals #1 to #4 are also multiplexed based on the same numerology as the UL data (and/or DL data) of user terminals #1 to #4 in a specific period. In FIG. 16 and FIG. 17, numerology is not switched in a specific period, so that it is not necessary to provide a period for suspending transmission and/or receipt in a predetermined period before and/or after a specific period.

To be more specific, the SRSs of user terminals #1 to #4 may be multiplexed with different numerologies by at least one of time division multiplexing, frequency division multiplexing, puncturing transmission and comb. Meanwhile, SRS (here, SRSs of user terminals #3 and #4) of the same numerology may be code division multiplexed (for example, CS sequence).

Third Aspect

In the third aspect, the configuration of the SRS is explained. In the SRS transmission described in the first aspect or the second aspect, the SRS may be (1) transmitted in the final symbol in each subframe, or (2) transmitted in a specific symbol specified by the network (for example, a radio base station), or (3) transmitted in a predetermined resource (for example, a predetermined resource element (RE)) in a resource block (for example, a PRB).

FIG. 18 is a diagram to show an example of the SRS configuration according to the third aspect. FIG. 18 shows (2) a case where the SRS is transmitted in a specific symbol specified by the network. As shown in FIG. 18, when an SRS is transmitted in a specific symbol, this SRS may be transmitted using the entire carrier (system band) or may be transmitted using a part of the band. Further, this specific symbol may be an arbitrary symbol in each subframe, or an arbitrary symbol in an arbitrary subframe.

FIG. 19 is a diagram to show another example of the SRS configuration according to the third aspect. FIG. 19 shows (3) a case where the SRS is transmitted in a predetermined RE in the PRB. The predetermined RE may be specified in advance by specifications or may be specified based on the above-mentioned SRS information which is signaled using at least one of higher layer signaling, broadcast information, and physical layer signaling.

Fourth Aspect

In the fourth aspect, an example of the SRS physical resource arrangement (allocation) method in SRS transmission described above will be described. The arrangement of physical SRS resources (SRS-puncturing transmission) described in the fourth aspect can be applied to the SRS transmission (for example, SRS multiplexing etc.) described in the first aspect or the second aspect. Note that the method of arranging the SRS according to the present embodiment is not limited to the example described in the fourth aspect.

When transmitting the SRS at a predetermined timing (for example, one subframe), the user terminal can arrange (allocate) the SRS in a distributed manner in the frequency direction. In this case, the user terminal controls the arrangement of the physical resources of the SRS based on information reported from the radio base station (network). The information reported from the radio base station (also referred to as "SRS arrangement information") is at least one of the frequency interval ($N_{RB}$) of the resource (for example, resource block (RB)) to which the SRS is allocated, the frequency index of the RB to which the SRS is allocated ($k_{RB}$), and the starting position of the SRS transmission frequency (the smallest RB number where the SRS is allocated).

The radio base station reports the frequency interval of the SRS-transmitting RB ($N_{RB}$) to the user terminal using the higher layer signaling (for example, RRC signaling, broadcast information, etc.). The radio base station may report the frequency interval ($N_{RB}$) selected from the predetermined value (for example, one of 1, 2, 3, or 4) to the user terminal.

Also, the radio base station reports the frequency index ($k_{RB}$) of the SRS-transmitting RB to the user terminal using the downlink control channel (PDCCH and/or EPDCCH) and/or the downlink shared channel (PDSCH). Alternatively, the radio base station may report the frequency index ($k_{RB}$) to the user terminal using higher layer signaling (or combining downlink control information and higher layer signaling).

The user terminal determines the arrangement of the physical resources that map the SRS based on the SRS arrangement information reported from the radio base station, and controls SRS transmission (see FIG. 20). FIG. 20 shows an example where the user terminal distributes the SRS and arranges it to a predetermined physical resource and transmits it (SRS-puncturing transmission).

The user terminal can determine the RB number (k) used for SRS transmission by using equation 2 below. FIG. 20 shows an example of arrangement of physical SRS resources of the user terminal when $N_{RB}=4$ and $k_{RB}=0$ are reported as SRS arrangement information from the radio base station.

$$k=k_0+n\cdot N_{RB}+k_{RB}(n=0,1,\ldots) \quad \text{(Equation 2)}$$

In equation 2, $k_0$ is the starting position of the SRS transmission frequency, and reported from the radio base station to the user terminal via higher layer signaling and so on. Note that the method of determining the SRS-transmitting RB number is not limited to equation 2. For example, SRS-transmitting RB number may be determined using the starting position of the SRS transmission frequency ($k_0$) and the frequency interval of the SRS-transmitting RB ($N_{RB}$) (without using $k_{RB}$).

The user terminal may change the arrangement of the physical SRS resources at each timing (for example, subframe) of transmitting the SRS. For example, the user terminal applies hopping to the SRS transmission based on hopping command reported from the radio base station in the higher layer signaling and/or downlink control channel (for example DCI) (see FIG. 21).

The user terminal can determine the RB number (k) used for SRS transmission by equation 3 below. FIG. 21A shows an example of the arrangement of the physical SRS resources of the user terminal reported by the radio base station as $N_{RB}=4$ and $k_{RB}=0$ as SRS arrangement information.

$$k=k_0+n\cdot N_{RB}+k_{RB}+P_{hop}(m)(n=0,1,\ldots)$$

$$m=i_{SRS}(\text{mod } N_{RB}) \quad \text{(Equation 3)}$$

where $i_{SRS}$ is the index of time where SRS is transmitted

The user terminal determines the arrangement of the SRS resources in each SRS transmission by using the information related to the hopping command (see FIG. 21B) reported from the radio base station and the equation 3 above.

Alternatively, the user terminal may be configured to determine the RB number used for SRS transmission based on a predefined hopping pattern calculation formula, regardless of the command from the radio base station (that is, the user terminal autonomously determines the RB number). In this case, the position where the physical SRS resource is arranged is controlled to shift in the frequency direction at each SRS transmission timing. For example, the calculation formula of the hopping pattern applied by the user terminal can be set to $P_{hop}(m)=P_{hop}(m-1)+1$.

As described above, when a user terminal transmits an SRS using a predetermined resource (for example, predetermined RB), based on the channel estimation result (channel gain) of the SRS transmitted in the predetermined RB, the channel state that pertains to the other RBs for which the SRS is not arranged may be estimated. For example, the radio base station estimates the channel state that pertains to other RBs for which the SRS is not transmitted using the channel estimation result, the user terminal pertains to multiple predetermined RBs arranging the SRS (see FIG. 22). FIG. 22 shows an example of the case where the radio base station estimates the channel state of the RB in which the SRS is not transmitted, using linear interpolation.

In this case, the user terminal can operate based on the assumption that the radio base station can estimate the channel state of the physical resource to which the SRS is not transmitted, based on the channel state of SRS-transmitting physical resource, and estimate the UL channel state in the total transmission frequency field.

Further, the radio base station may estimate the channel gain of the physical resource to which the SRS is not transmitted based on the estimated channel gain, based on the SRS received power transmitted multiple times (for example, a plurality of subframes) from the user terminal (see FIGS. 23A and 23B). FIG. 23B shows a case where, based on the channel gain estimated based on the received power for the last two (for example, two subframes with m=0 and 3) of the SRS received from the user terminal, the radio base station estimates the channel gain of the physical resource to which the SRS is not transmitted.

In this way, in consideration of multiple SRS transmissions transmitted from the user terminal, the channel state is estimated, so that, even when arranging the SRS resources distributed in the frequency direction, it is possible to improve the accuracy of channel estimation of resources for which SRS is not arranged. Also, by performing channel estimation based on multiple SRS transmissions to which hopping is applied, the accuracy of linear interpolation can be improved and the accuracy of channel estimation can be effectively improved.

When SRS arrangement information is received from the radio base station, the user terminal changes the arrangement of the physical resources of the SRS at a predetermined timing, and controls SRS transmission. For example, if the user terminal receives the information of the arrangement of the SRS in the physical layer control information (downlink control information) and/or the RRC signaling, the user terminal changes the SRS arrangement resource from the SRS transmission after this reception.

Alternatively, if SRS arrangement information is received in physical layer control information and/or RRC signaling, the user terminal may change (update) the SRS arrangement at the time of SRS transmission after expiration of the preconfigured timer without immediately changing the SRS arrangement. In this case, the user terminal controls SRS transmission by using already configured resources unless the SRS arrangement information is reported from the radio base station.

FIG. 24 shows an example of the operation when the user terminal controls SRS transmission using a predetermined physical resource.

First, the user terminal receives information related to the frequency interval of the SRS-transmitting RB and the frequency index of the SRS-transmitting RB (may be the position where the allocation of SRS starts) from the radio base station (ST 21 and ST 22). When hopping is applied to SRS transmission, the user terminal may receive information related to the hopping pattern from the radio base station (ST 23). Note that when hopping patterns are autonomously determined on the user terminal side, information related to the hopping pattern may not be reported from the radio base station to the user terminal.

Based on the SRS arrangement information received from the radio base station, the user terminal determines a physical resource (for example, RB number) to arrange the SRS (ST 24). For example, the user terminal determines the SRS arrangement position at the transmission timing (for example, SRS-transmitting sub frame) of each SRS using equation 3 above.

When the preconfigured timer expires, the user terminal changes (updates) the arrangement of the physical SRS resources based on the decision in ST 24 (ST 25). Thereafter, the user terminal performs SRS transmission based on the updated physical resource arrangement (ST 26). The radio base station performs channel estimation based on the SRS transmitted from the user terminal. At this time, as shown in FIG. 23 and FIG. 24, the radio base station may estimate the frequency domain UL channel state in which the SRS is not arranged by linear interpolation (ST 27).

FIG. 25 and FIG. 26 show examples of how to use free resources generated by the SRS-puncturing transmission. As described above, the user terminal arranges the SRS in a distributed manner in the frequency direction (SRS-puncturing transmission), and as a result, a free physical resource not used for SRS transmission by the user terminal occurs. In this case, another user terminal may transmit the UL signal (for example, SRS and/or UL data etc.) using the free physical resource (see FIG. 25).

FIG. 25 shows a case in the SRS-transmitting subframe, each user terminal transmits the SRS in a distributed manner in the frequency direction (SRS-puncturing transmission), and maps SRSs of different user terminals to adjacent resources. SRS and/or UL data of other user terminals can be transmitted using the resources generated by the SRS-puncturing transmission, so that the frequency utilization efficiency can be improved.

Also, the user terminal may transmit SRS and/or UL data of multiple layers in space multiplexing using free physical resources generated by SRS-puncturing transmission (see FIG. 26). FIG. 26 shows the case in the SRS-transmitting subframe, each user terminal performs SRS-puncturing transmission, and SRS and/or UL data of different layers of the same user terminal, or SRS and/or UL data of different user terminals, are mapped to adjacent resources. In this case, the radio base station performs channel estimation using the SRS transmitted in the puncturing transmission thereby the base station can measure the channel quality state of each layer required for UL MIMO communication.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

FIG. 27 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 27 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), either long TTIs or short TTIs may be used, or both long TTIs and short TTIs may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL. SC-FDMA can also be applied to the side links (SL) used for inter-terminal communication.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Blocks) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, UL data channel (PUSCH (Physical Uplink Shared CHannel, which is also referred to as "UL shared channel" and so on)), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of retransmission command information (ACK/NACK), channel state information (CSI) and so on, is communicated in the PUSCH or the PUCCH. By means of the PRACH, random access preambles for establishing connections with cells are communicated.

In the radio communication system 1, an SL data channel for communicating SL data (also referred to as "PSSSCH (Physical Sidelink Shared CHannel)," "SL shared channel" and the like), an SL control channel (PSCCH (Physical Sidelink Control CHannel)) and so on are used as SL channels.

(Radio Base Station)

FIG. 28 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

Also, the transmitting/receiving sections 103 transmits DL signals (including DL data signal, DL control signal, DL reference signal, etc.) to a plurality of user terminals 20 that use different numerologies, and receives UL signals (including UL data signal, UL control signal, UL reference signal (for example, SRS, DMRS, etc.)) from these multiple user terminals 20. In addition, the transmitting/receiving sections 103 transmit information related to UL reference signals (for example, SRS information related to SRS (see FIG. 6 to FIG. 9)).

FIG. 29 is a diagram to show an example of a functional structure of a radio base station according to one embodiment of the present invention. Note that, although FIG. 29 primarily shows functional blocks that pertain to characteristic parts of the present embodiment, the radio base station 10 has other functional blocks that are necessary for radio communication as well. As shown in FIG. 29, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving processes (for example, demodulation) for UL signals by the received signal processing section 304 and the measurements by the measurement section 305.

To be more specific, the control section 301 schedules a plurality of user terminals 20 that use different numerologies. For example, the control section 301 may multiplex DL signals and/or UL signals of these multiple user terminals 20 by using at least one of frequency division multiplexing, time division multiplexing, code division multiplexing, space multiplexing, and power multiplexing. These multiple user terminals 20 may be scheduled based on the channel quality measured in the measurement section 305, and this channel quality may be measured based on UL reference signals from these multiple user terminals 20.

In addition, the control section 301 may multiplex UL reference signals of multiple user terminals 20 that use different numerologies in a specific period. To be more specific, when numerologies are coordinated in a specific period, the control section 301 may multiplex UL reference signals of these multiple user terminals 20 by using at least one of frequency division multiplexing, time division multiplexing, code division multiplexing (for example, CS sequence), comb, and puncturing transmission (see the first aspect and FIG. 12).

On the other hand, if numerologies are not coordinated in a specific period, the control section 301 may multiplex UL reference signals of multiple user terminals 20 that use different numerologies, by using at least one of frequency division multiplexing, time division multiplexing, comb and puncturing transmission, and the control section 301 may multiplex UL reference signals of a plurality of user terminals 20 of the same numerology by code division multiplexing (for example, CS sequence) (see the first aspect, FIG. 16 and FIG. 17).

Further, the control section 401 controls generation and transmission of information (for example, the SRS information (see FIG. 6 to FIG. 9)) on the UL reference signal multiplexed in the above-mentioned specific period.

The control section 301 can be constituted by a controller, a control circuit or control apparatus that can be described based on general understanding of the technical field to which the present invention pertains.

The transmission signal generation section 302 generates DL signals (including DL data, scheduling information, reference signals, etc.) based on commands from the control section 301, and outputs these to the mapping section 303. For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs the receiving process (for example, demapping, demodulation, decoding and so on) of uplink signals that are transmitted from the user terminals 20. To be more specific, the received signal processing section 304 performs the UL signal receiving process based on the numerology configured in the user terminal 20. To be more specific, the received signal processing section 304 may output the received signals, the signals after the receiving process and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, the measurement section 305 may measure the channel quality in UL based on, for example, the received power (for example, RSRP (Reference Signal Received Power)) and/or the received quality (for example, RSRQ (Reference Signal Received Quality)) of UL reference signals. The measurement results may be output to the control section 301.

(User Terminal)

FIG. 30 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. DL (SL) data is forwarded to the application section 205. The application section 205 performs processes related to higher layers above the physical layer and the MAC layer, and so on. Furthermore, in the downlink data, broadcast information is also forwarded to the application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, DL retransmission control information, channel state information, etc.) is also subjected to channel encoding, rate matching, puncturing, DFT process, IFFT process, etc., and transferred to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive the DL signals (including DL data signals, DL control signals, DL reference signals, etc.) of the numerology configured in the user terminal 20, and transmits the UL signals (including UL data signals, UL control signals, UL reference signals, etc.) of the numerology. In addition, the transmitting/receiving sections 203 receive information related to UL reference signals (for example, SRS information related to SRS (see FIG. 6 to FIG. 9)).

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

FIG. 31 is a diagram to show an example of a functional structure of a user terminal according to one embodiment of the present invention. Note that, although FIG. 31 primarily shows functional blocks that pertain to characteristic parts of the present embodiment, the user terminal 20 has other functional blocks that are necessary for radio communication as well. As shown in FIG. 31, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, generation of UL signals in the transmission signal generation section 402, mapping of UL (SL) signals in the mapping section 403, the DL signal receiving process in the received signal processing section 404, and measurements in the measurement section 405 and so on.

To be more specific, the control section 401 controls transmission of a UL reference signal in a specific period based on information related to the UL reference signal. Here, information related to a UL reference signal may include at least one of numerology information to show the numerology used to transmit this UL reference signal, bandwidth information to show the transmission bandwidth of this UL reference signal, CS sequence information to show the cyclic shift (CS) sequence used to transmit this UL reference signal, and specific period information to show the above specific period.

In addition, during the above specified period, the control section 401 may exert control so that UL reference signals of multiple user terminals 20, where different numerologies are configured, are transmitted using the same numerology (see the first aspect and FIG. 3, FIG. 5, FIG. 10, and FIG. 11). For example, the control section 401 may suspend transmission and/or receipt in a predetermined period before and/or after the specific period, and switch the numerology in this specific period. Further, the control section 401 may perform the above switching, when the numerology configured in the user terminal 20 is different from the numerology indicated by the numerology information. Also, if no UL reference signal is transmitted in the specific period, the control section 401 does not have to perform the above-described switching.

Alternatively, during the above specified period, the control section 401 may exert control so that UL reference signals of multiple user terminals 20 where different numerologies are configured are transmitted by using different numerologies (see the second aspect, FIG. 4, and FIG. 13 to FIG. 15). In this case, in at least one subframe (TTI) in a specific period, the control section 401 may exert control so that only the UL reference signals are transmitted, exert control so that the UL reference signals and UL data are transmitted, or exert control so that only UL data is transmitted.

Further, the control section 401 may control the configuration of SRSs (third aspect). In addition, the control section 401 may control SRS-puncturing transmission (fourth aspect).

For the control section 401, a controller, a control circuit or control apparatus that can be described based on general understanding of the technical field to which the present invention pertains can be used.

In the transmission signal generation section 402, UL signals (including UL data signal, UL control signal, UL reference signal, UCL etc.) are generated (including, for example, encoding, rate matching, puncturing, modulation, etc.) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signal, scheduling information, DL control signal, DL reference signal, etc.). The received signal processing section 404 outputs the information received from the radio base station 10, to the control section 401. The received signal processing section 404 outputs, for example, broadcast information, system information, higher layer control information related to higher layer signaling such as RRC signaling, L1/L2 control information and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

That is, a radio base station, a user terminal and so on according to an embodiment of the present invention may function as a computer that executes the processes of the radio communication method of the present invention. FIG. 32 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (one ms) in existing LTE, may be a shorter period than one ms (for example, one to thirteen symbols), or may be a longer period than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PDCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-106837, filed on May 27, 2016, including the specification, drawings and abstract, is incorporated herein by reference in its entirety.

The invention claimed is:

1. A terminal comprising:
a receiver that receives information related to sounding reference signal (SRS) by Radio Resource Control (RRC) signaling; and
a processor that controls a transmission of the SRS in a symbol determined based on information related to a number of symbols included in the information,
wherein, in the symbol, SRSs of a plurality of terminals where different numerologies with subcarrier spacings of N×15 kHz are configured are multiplexed using a same numerology,
wherein the processor performs a switching of numerology based on higher layer signaling, and controls the multiplexing of the SRS using the same numerologies, and wherein the processor interrupts the transmission of the SRS at the switching.

2. A radio communication method for terminal comprising: receiving information related to sounding reference signal (SRS) by Radio Resource Control (RRC) signaling;
performing a switching of numerology based on higher layer signaling;
interrupting transmission of the SRS at the switching;
controlling multiplexing of the SRS using the same numerologies; and
controlling the transmission of the SRS in a symbol determined based on information related to a number of symbols included in the information,
wherein, in the symbol, SRSs of a plurality of terminals where different numerologies with subcarrier spacings of N×15 kHz are configured are multiplexed using a same numerology.

3. A base station comprising: a transmitter that transmits information related to sounding reference signal (SRS) by Radio Resource Control (RRC) signaling; and
a processor that controls a reception of the SRS in a symbol determined based on information related to a number of symbols included in the information,
wherein, in the symbol, SRSs of a plurality of terminals where different numerologies with subcarrier spacings of N×15 kHz are configured are multiplexed using a same numerology,
wherein a switching of numerology is performed based on higher layer signaling, the multiplexing of the SRS using the same numerologies is controlled, and the transmission of the SRS at the switching is interrupted.

4. A system comprising a terminal and a base station:
the terminal comprises:
a receiver that receives information related to sounding reference signal (SRS) by Radio Resource Control (RRC) signaling; and
a first processor that controls a transmission of the SRS in a symbol determined based on information related to a number of symbols included in the information,
wherein, in the symbol, SRSs of a plurality of terminals where different numerologies with subcarrier spacings of N×15 kHz are configured are multiplexed using a same numerology, and wherein the first processor performs a switching of numerology based on higher layer signaling, and controls the multiplexing of the SRS using the same numerologies, and interrupts the transmission of the SRS at the switching; and the base station comprises: a transmitter that transmits the information related to the SRS; and a second processor that controls a reception of the SRS.

* * * * *